(12) United States Patent
Errico et al.

(10) Patent No.: US 7,904,814 B2
(45) Date of Patent: Mar. 8, 2011

(54) SYSTEM FOR PRESENTING AUDIO-VIDEO CONTENT

(75) Inventors: James Errico, Portland, OR (US);
Petrus J. L. van Beek, Vancouver, WA (US); Ahmet Mufit Ferman, Vancouver, WA (US); Baoxin Li, Vancouver, WA (US); Louis J. Kerofsky, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 528 days.

(21) Appl. No.: 10/016,941

(22) Filed: Dec. 13, 2001

(65) Prior Publication Data

US 2002/0180774 A1 Dec. 5, 2002

Related U.S. Application Data

(60) Provisional application No. 60/285,553, filed on Apr. 19, 2001, provisional application No. 60/297,091, filed on Jun. 7, 2001, provisional application No. 60/329,771, filed on Oct. 16, 2001.

(51) Int. Cl.
*G06F 3/048* (2006.01)
(52) U.S. Cl. .......................... 715/725; 715/202
(58) Field of Classification Search .................. 715/721, 715/719, 720, 723, 716, 727, 725, 202
See application file for complete search history.

(56) References Cited

U.S. PATENT DOCUMENTS

| | | |
|---|---|---|
| 4,183,056 A | 1/1980 | Evans et al. |
| 4,253,108 A | 2/1981 | Engel |
| 4,298,884 A | 11/1981 | Reneau |
| 4,321,635 A | 3/1982 | Tsuyuguchi |
| 4,324,402 A | 4/1982 | Klose |
| 4,520,404 A | 5/1985 | Von Kohorn |
| 4,729,044 A | 3/1988 | Kiesel |
| 4,937,685 A | 6/1990 | Barker et al. |
| 5,012,334 A | 4/1991 | Etra |
| 5,027,400 A | 6/1991 | Baji et al. |
| 5,101,364 A | 3/1992 | Davenport et al. |
| 5,109,482 A | 4/1992 | Bohrman |
| 5,148,154 A | 9/1992 | MacKay et al. |
| 5,200,825 A | 4/1993 | Perine |
| 5,222,924 A | 6/1993 | Shin et al. |
| 5,241,671 A | 8/1993 | Reed et al. |

(Continued)

FOREIGN PATENT DOCUMENTS

EP 0 854 645 7/1998

(Continued)

OTHER PUBLICATIONS

Christel, Michael G., Hauptmann, Alexander G., Warmack, Adrienne S., Crosby, Scott A. "Adjustable Filmstrips and Skims as Abstractions for a Digital Video Library". IEEE Advances in Digital Libraries Conference, May 19-21, 1999: pp. 4 and 5.*

(Continued)

*Primary Examiner* — Namitha Pillai
(74) *Attorney, Agent, or Firm* — Chernoff, Vilhauer, McClung & Stenzel

(57) ABSTRACT

A system for presenting a summarization of audio and/or visual content having a plurality of segments to a user together with a graphical user interface that preferably indicates to the viewer the relative temporal position of video segments viewed in the summary within the content from which the summary was derived.

80 Claims, 9 Drawing Sheets

U.S. PATENT DOCUMENTS

| | | |
|---|---|---|
| 5,288,069 A | 2/1994 | Matsumoto |
| D348,251 S | 6/1994 | Hendricks |
| 5,333,091 A | 7/1994 | Iggulden et al. |
| 5,339,393 A | 8/1994 | Duffy et al. |
| D354,059 S | 1/1995 | Hendricks |
| 5,381,477 A | 1/1995 | Beyers, II et al. |
| 5,404,316 A | 4/1995 | Klingler et al. |
| 5,410,344 A | 4/1995 | Graves et al. |
| 5,424,770 A | 6/1995 | Schmelzer et al. |
| 5,434,678 A | 7/1995 | Abecassis |
| 5,444,499 A | 8/1995 | Saitoh |
| 5,452,016 A | 9/1995 | Ohara et al. |
| 5,459,830 A | 10/1995 | Ohba et al. |
| 5,483,278 A | 1/1996 | Strubbe et al. |
| D368,263 S | 3/1996 | Hendricks |
| 5,521,841 A | 5/1996 | Arman et al. |
| 5,550,965 A | 8/1996 | Gabbe et al. |
| 5,559,549 A | 9/1996 | Hendricks et al. |
| 5,589,945 A | 12/1996 | Abecassis |
| 5,600,364 A | 2/1997 | Hendricks et al. |
| 5,600,573 A | 2/1997 | Hendricks et al. |
| 5,600,781 A | 2/1997 | Root et al. |
| 5,610,653 A | 3/1997 | Abecassis |
| 5,634,849 A | 6/1997 | Abecassis |
| 5,635,982 A | 6/1997 | Zhang et al. |
| D381,991 S | 8/1997 | Hendricks |
| 5,654,769 A | 8/1997 | Ohara et al. |
| 5,659,350 A | 8/1997 | Hendricks et al. |
| 5,664,046 A | 9/1997 | Abecassis |
| 5,664,227 A | 9/1997 | Mauldin et al. |
| 5,675,752 A | 10/1997 | Scott et al. |
| 5,682,195 A | 10/1997 | Hendricks et al. |
| 5,682,460 A | 10/1997 | Hyziak et al. |
| 5,684,918 A | 11/1997 | Abecassis |
| 5,694,163 A | 12/1997 | Harrison |
| 5,696,869 A | 12/1997 | Abecassis |
| 5,696,965 A | 12/1997 | Dedrick |
| 5,710,884 A | 1/1998 | Dedrick |
| 5,717,814 A | 2/1998 | Abecassis |
| 5,717,879 A * | 2/1998 | Moran et al. ............... 715/716 |
| 5,717,923 A | 2/1998 | Dedrick |
| 5,724,472 A | 3/1998 | Abecassis |
| 5,727,129 A | 3/1998 | Barrett et al. |
| 5,732,216 A | 3/1998 | Logan et al. |
| 5,734,853 A | 3/1998 | Hendricks et al. |
| 5,751,953 A | 5/1998 | Shiels et al. |
| 5,758,257 A | 5/1998 | Herz et al. |
| 5,758,259 A | 5/1998 | Lawler |
| 5,761,881 A | 6/1998 | Wall |
| 5,764,916 A | 6/1998 | Busey et al. |
| 5,774,357 A | 6/1998 | Hoffberg et al. |
| 5,774,666 A | 6/1998 | Portuesi |
| 5,778,108 A | 7/1998 | Coleman, Jr. |
| 5,781,188 A | 7/1998 | Amiot et al. |
| 5,794,210 A | 8/1998 | Goldhaber et al. |
| 5,797,001 A | 8/1998 | Augenbraun et al. |
| 5,798,785 A | 8/1998 | Hendricks et al. |
| 5,805,733 A | 9/1998 | Wang et al. |
| 5,809,426 A | 9/1998 | Radojeric et al. |
| 5,821,945 A | 10/1998 | Yeo et al. |
| 5,822,537 A | 10/1998 | Katseff et al. |
| 5,828,809 A | 10/1998 | Chang et al. |
| 5,828,839 A | 10/1998 | Moncreiff |
| 5,835,087 A | 11/1998 | Herz et al. |
| D402,310 S | 12/1998 | Hendricks |
| 5,848,396 A | 12/1998 | Gerace |
| 5,857,190 A | 1/1999 | Brown |
| 5,861,881 A | 1/1999 | Freeman et al. |
| 5,867,226 A | 2/1999 | Wehmeyer et al. |
| 5,867,386 A | 2/1999 | Hoffberg et al. |
| 5,875,107 A | 2/1999 | Nagai et al. |
| 5,875,108 A | 2/1999 | Hoffberg et al. |
| 5,877,821 A | 3/1999 | Newlin et al. |
| 5,878,222 A | 3/1999 | Harrison |
| 5,892,536 A | 4/1999 | Logan et al. |
| 5,900,867 A | 5/1999 | Schindler et al. |
| 5,901,246 A | 5/1999 | Hoffberg et al. |
| 5,903,454 A | 5/1999 | Hoffberg et al. |
| 5,907,324 A | 5/1999 | Larson et al. |
| 5,913,013 A | 6/1999 | Abecassis |
| 5,913,030 A | 6/1999 | Lotspiech et al. |
| 5,920,300 A | 7/1999 | Yamazaki et al. |
| 5,920,360 A | 7/1999 | Coleman, Jr. |
| 5,920,477 A | 7/1999 | Hoffberg et al. |
| 5,923,365 A | 7/1999 | Tamir et al. |
| 5,926,624 A | 7/1999 | Katz et al. |
| 5,930,783 A | 7/1999 | Li et al. |
| 5,933,811 A | 8/1999 | Angles et al. |
| 5,945,988 A | 8/1999 | Williams et al. |
| 5,956,026 A | 9/1999 | Ratakonda |
| 5,956,037 A | 9/1999 | Osawa et al. |
| 5,958,006 A | 9/1999 | Eggleston et al. |
| 5,959,681 A | 9/1999 | Cho |
| 5,959,697 A | 9/1999 | Coleman, Jr. |
| 5,969,755 A | 10/1999 | Courtney |
| 5,973,683 A | 10/1999 | Cragun et al. |
| 5,977,964 A | 11/1999 | Williams et al. |
| 5,986,690 A | 11/1999 | Hendricks |
| 5,986,692 A | 11/1999 | Logan et al. |
| 5,987,211 A | 11/1999 | Abecassis |
| 5,990,927 A | 11/1999 | Hendricks et al. |
| 5,990,980 A | 11/1999 | Golin |
| 5,995,094 A | 11/1999 | Eggen et al. |
| 5,995,095 A | 11/1999 | Ratakonda |
| 6,002,833 A | 12/1999 | Abecassis |
| 6,005,565 A | 12/1999 | Legall et al. |
| 6,005,597 A | 12/1999 | Barrett et al. |
| 6,006,265 A | 12/1999 | Rangan et al. |
| 6,011,895 A | 1/2000 | Abecassis |
| 6,014,183 A | 1/2000 | Hoang |
| 6,020,883 A | 2/2000 | Herz et al. |
| 6,029,195 A | 2/2000 | Herz |
| 6,038,367 A | 3/2000 | Abecassis |
| 6,041,323 A | 3/2000 | Kubota |
| 6,049,821 A | 4/2000 | Theriault et al. |
| 6,052,554 A | 4/2000 | Hendricks et al. |
| 6,055,018 A | 4/2000 | Swan |
| 6,055,569 A | 4/2000 | O'Brien et al. |
| 6,060,167 A | 5/2000 | Morgan et al. |
| 6,064,385 A | 5/2000 | Sturgeon et al. |
| 6,064,449 A | 5/2000 | White et al. |
| 6,067,401 A | 5/2000 | Abecassis |
| 6,070,167 A | 5/2000 | Qian et al. |
| 6,072,934 A | 6/2000 | Abecassis |
| 6,076,166 A | 6/2000 | Moshfeghi et al. |
| 6,078,917 A | 6/2000 | Paulsen, Jr. et al. |
| 6,078,928 A | 6/2000 | Schnase et al. |
| 6,081,278 A | 6/2000 | Chen |
| 6,081,750 A | 6/2000 | Hoffberg et al. |
| 6,088,455 A | 7/2000 | Logan et al. |
| 6,088,722 A | 7/2000 | Herz et al. |
| 6,091,886 A | 7/2000 | Abecassis |
| RE36,801 E | 8/2000 | Logan et al. |
| 6,100,941 A | 8/2000 | Dimitrova et al. |
| 6,115,709 A | 9/2000 | Gilmour et al. |
| 6,122,657 A | 9/2000 | Hoffman, Jr. et al. |
| 6,128,624 A | 10/2000 | Papierniak et al. |
| 6,133,909 A | 10/2000 | Schein et al. |
| 6,137,486 A | 10/2000 | Yoshida et al. |
| 6,141,041 A | 10/2000 | Carlbom et al. |
| 6,141,060 A | 10/2000 | Honey et al. |
| 6,144,375 A * | 11/2000 | Jain et al. ............... 715/500.1 |
| 6,151,444 A | 11/2000 | Abecassis |
| D435,561 S | 12/2000 | Pettigrew et al. |
| 6,157,377 A | 12/2000 | Shah-Nazaroff et al. |
| 6,160,989 A | 12/2000 | Hendricks et al. |
| 6,161,142 A | 12/2000 | Wolfe et al. |
| 6,163,316 A | 12/2000 | Killian |
| 6,163,779 A | 12/2000 | Mantha et al. |
| 6,169,542 B1 | 1/2001 | Hooks et al. |
| 6,177,931 B1 | 1/2001 | Alexander et al. |
| 6,181,335 B1 | 1/2001 | Hendricks et al. |
| 6,185,625 B1 | 2/2001 | Tso et al. |
| 6,195,497 B1 | 2/2001 | Nagasaka et al. |
| 6,198,767 B1 | 3/2001 | Greenfield et al. |
| 6,199,076 B1 | 3/2001 | Logan et al. |
| 6,201,536 B1 | 3/2001 | Hendricks et al. |

| Patent No. | Date | Name |
|---|---|---|
| 6,208,805 B1 | 3/2001 | Abecassis |
| 6,212,527 B1 | 4/2001 | Gustman |
| 6,215,526 B1 | 4/2001 | Barton et al. |
| 6,216,129 B1 | 4/2001 | Eldering |
| 6,219,837 B1 * | 4/2001 | Yeo et al. .................... 725/38 |
| 6,226,678 B1 | 5/2001 | Mattaway et al. |
| 6,230,172 B1 | 5/2001 | Purnaveja et al. |
| 6,230,501 B1 | 5/2001 | Bailey, Sr. et al. |
| 6,233,289 B1 | 5/2001 | Fredrickson |
| 6,233,389 B1 | 5/2001 | Barton et al. |
| 6,233,586 B1 | 5/2001 | Chang et al. |
| 6,233,590 B1 | 5/2001 | Shaw et al. |
| 6,236,395 B1 | 5/2001 | Sezan et al. |
| 6,240,406 B1 | 5/2001 | Tannen |
| 6,252,544 B1 | 6/2001 | Hoffberg |
| 6,253,203 B1 | 6/2001 | O'Flaherty et al. |
| 6,269,216 B1 | 7/2001 | Abecassis |
| 6,275,268 B1 | 8/2001 | Ellis et al. |
| 6,286,140 B1 | 9/2001 | Ivanyi |
| 6,286,141 B1 | 9/2001 | Browne et al. |
| 6,289,165 B1 | 9/2001 | Abecassis |
| 6,298,482 B1 | 10/2001 | Seidman et al. |
| 6,304,665 B1 | 10/2001 | Cavallaro et al. |
| 6,304,715 B1 | 10/2001 | Abecassis |
| 6,311,189 B1 | 10/2001 | DeVries et al. |
| 6,317,718 B1 | 11/2001 | Fano |
| 6,317,881 B1 | 11/2001 | Shah-Nazaroff et al. |
| 6,320,624 B1 | 11/2001 | Ayer et al. |
| 6,324,338 B1 | 11/2001 | Wood et al. |
| 6,339,842 B1 | 1/2002 | Fernandez et al. |
| 6,342,904 B1 | 1/2002 | Vasudevan et al. |
| 6,353,444 B1 | 3/2002 | Katta et al. |
| 6,363,160 B1 | 3/2002 | Bradski et al. |
| 6,363,380 B1 | 3/2002 | Dimitrova |
| 6,370,504 B1 | 4/2002 | Zick et al. |
| 6,370,688 B1 | 4/2002 | Hejna, Jr. |
| 6,374,404 B1 | 4/2002 | Brotz et al. |
| 6,405,371 B1 | 6/2002 | Oosterhout et al. |
| 6,412,008 B1 | 6/2002 | Fields et al. |
| 6,418,168 B1 | 7/2002 | Narita |
| 6,421,680 B1 | 7/2002 | Kumhyr et al. |
| 6,425,133 B1 | 7/2002 | Leary |
| 6,426,761 B1 | 7/2002 | Kanevsky et al. |
| 6,426,974 B2 | 7/2002 | Takahashi et al. |
| 6,438,579 B1 | 8/2002 | Hosken |
| 6,439,572 B1 | 8/2002 | Bowen |
| 6,446,261 B1 | 9/2002 | Rosser |
| 6,470,378 B1 | 10/2002 | Tracton et al. |
| 6,480,667 B1 | 11/2002 | O'Connor |
| 6,487,390 B1 | 11/2002 | Virine et al. |
| 6,490,320 B1 | 12/2002 | Vetro et al. |
| 6,498,783 B1 | 12/2002 | Lin |
| 6,522,342 B1 | 2/2003 | Gagnon et al. |
| 6,530,082 B1 | 3/2003 | Del Sesto et al. |
| 6,535,639 B1 | 3/2003 | Uchihachi et al. |
| 6,542,546 B1 | 4/2003 | Vetro et al. |
| 6,543,053 B1 | 4/2003 | Li et al. |
| 6,546,555 B1 | 4/2003 | Hjelsvold et al. |
| 6,549,643 B1 | 4/2003 | Toklu et al. |
| 6,553,178 B2 | 4/2003 | Abecassis |
| 6,556,767 B2 | 4/2003 | Okayama et al. |
| 6,571,279 B1 | 5/2003 | Herz et al. |
| 6,578,075 B1 | 6/2003 | Nieminen et al. |
| 6,581,207 B1 | 6/2003 | Sumita et al. |
| 6,587,127 B1 | 7/2003 | Leeke et al. |
| 6,593,936 B1 | 7/2003 | Huang et al. |
| 6,594,699 B1 | 7/2003 | Sahai et al. |
| 6,597,859 B1 | 7/2003 | Leinhart et al. |
| 6,611,876 B1 | 8/2003 | Barrett et al. |
| 6,614,987 B1 | 9/2003 | Ismail et al. |
| 6,621,895 B1 | 9/2003 | Giese |
| 6,628,302 B2 | 9/2003 | White et al. |
| 6,637,032 B1 | 10/2003 | Feinleib |
| 6,658,095 B1 | 12/2003 | Yoakum et al. |
| 6,665,423 B1 | 12/2003 | Mehrotra et al. |
| 6,675,158 B1 | 1/2004 | Rising et al. |
| 6,678,635 B2 * | 1/2004 | Tovinkere et al. ............ 702/179 |
| 6,678,659 B1 | 1/2004 | Van Kommer |
| 6,681,395 B1 | 1/2004 | Nishi |
| 6,691,126 B1 | 2/2004 | Syeda-Mahmood |
| 6,697,523 B1 | 2/2004 | Divakaran et al. |
| 6,704,929 B1 | 3/2004 | Ozer et al. |
| 6,724,933 B1 | 4/2004 | Lin et al. |
| 6,741,655 B1 | 5/2004 | Chang et al. |
| 6,754,904 B1 | 6/2004 | Cooper et al. |
| 6,754,906 B1 | 6/2004 | Finseth et al. |
| 6,766,362 B1 | 7/2004 | Miyasaka et al. |
| 6,774,917 B1 | 8/2004 | Foote et al. |
| 6,810,200 B1 | 10/2004 | Aoyama et al. |
| 6,813,775 B1 | 11/2004 | Finseth et al. |
| 6,820,278 B1 | 11/2004 | Ellis |
| 6,829,781 B1 | 12/2004 | Bhagavath et al. |
| 6,868,440 B1 | 3/2005 | Gupta et al. |
| 6,880,171 B1 * | 4/2005 | Ahmad et al. ................ 725/134 |
| 6,898,762 B2 | 5/2005 | Ellis et al. |
| 6,925,455 B2 | 8/2005 | Gong et al. |
| 6,931,595 B2 | 8/2005 | Pan et al. |
| 6,934,964 B1 | 8/2005 | Schaffer et al. |
| 6,961,954 B1 | 11/2005 | Maybury et al. |
| 6,970,510 B1 | 11/2005 | Wee et al. |
| 6,971,105 B1 | 11/2005 | Weber et al. |
| 6,981,129 B1 | 12/2005 | Boggs et al. |
| 6,983,478 B1 | 1/2006 | Grauch et al. |
| 6,990,679 B1 | 1/2006 | Curreri |
| 6,993,245 B1 | 1/2006 | Harville |
| 7,003,792 B1 | 2/2006 | Yuen |
| 7,026,964 B2 | 4/2006 | Baldwin et al. |
| 7,055,168 B1 | 5/2006 | Errico et al. |
| 7,065,709 B2 | 6/2006 | Ellis et al. |
| 7,096,486 B1 | 8/2006 | Ukai et al. |
| 7,127,735 B1 | 10/2006 | Lee et al. |
| 7,130,866 B2 | 10/2006 | Schaffer |
| 7,136,710 B1 | 11/2006 | Hoffberg et al. |
| 7,146,626 B1 | 12/2006 | Arsenault et al. |
| 7,150,030 B1 | 12/2006 | Eldering et al. |
| 7,185,355 B1 | 2/2007 | Ellis et al. |
| 7,199,798 B1 | 4/2007 | Echigo et al. |
| 7,249,366 B1 | 7/2007 | Flavin |
| 7,296,285 B1 | 11/2007 | Jun et al. |
| 7,343,381 B2 | 3/2008 | Shin |
| 7,380,262 B2 | 5/2008 | Wang et al. |
| 7,454,775 B1 | 11/2008 | Schaffer et al. |
| 2001/0030664 A1 | 10/2001 | Shulman et al. |
| 2001/0043744 A1 | 11/2001 | Hieda |
| 2002/0012526 A1 * | 1/2002 | Sai et al. ...................... 386/69 |
| 2002/0013943 A1 | 1/2002 | Haberman et al. |
| 2002/0018594 A1 | 2/2002 | Xu et al. |
| 2002/0026345 A1 | 2/2002 | Juels |
| 2002/0069218 A1 | 6/2002 | Sull et al. |
| 2002/0079165 A1 | 6/2002 | Wolfe |
| 2002/0080162 A1 | 6/2002 | Pan et al. |
| 2002/0083473 A1 | 6/2002 | Agnihotri et al. |
| 2002/0087967 A1 | 7/2002 | Conkwright et al. |
| 2002/0093591 A1 | 7/2002 | Gong et al. |
| 2002/0097165 A1 | 7/2002 | Hulme |
| 2002/0104087 A1 | 8/2002 | Schaffer et al. |
| 2002/0108112 A1 | 8/2002 | Wallace et al. |
| 2002/0120929 A1 | 8/2002 | Schwalb et al. |
| 2002/0133412 A1 | 9/2002 | Oliver et al. |
| 2002/0140719 A1 | 10/2002 | Amir et al. |
| 2002/0141619 A1 | 10/2002 | Standridge et al. |
| 2002/0156909 A1 | 10/2002 | Harrington |
| 2002/0178135 A1 | 11/2002 | Tanaka |
| 2002/0184220 A1 | 12/2002 | Teraguchi et al. |
| 2002/0190991 A1 | 12/2002 | Efran et al. |
| 2002/0194589 A1 | 12/2002 | Cristofalo et al. |
| 2003/0001880 A1 | 1/2003 | Holtz et al. |
| 2003/0007555 A1 | 1/2003 | Divakaran et al. |
| 2003/0026592 A1 | 2/2003 | Kawahara et al. |
| 2003/0033288 A1 | 2/2003 | Shanahan et al. |
| 2003/0066068 A1 | 4/2003 | Gutta et al. |
| 2003/0067554 A1 | 4/2003 | Klarfeld et al. |
| 2003/0072440 A1 | 4/2003 | Murray et al. |
| 2003/0081937 A1 | 5/2003 | Li |
| 2003/0084448 A1 | 5/2003 | Soundararajan |
| 2003/0084450 A1 | 5/2003 | Thurston et al. |
| 2003/0088872 A1 | 5/2003 | Maissel et al. |
| 2003/0093792 A1 | 5/2003 | Labeeb et al. |

| | | |
|---|---|---|
| 2003/0105682 A1 | 6/2003 | Dicker et al. |
| 2003/0172374 A1 | 9/2003 | Vinson et al. |
| 2003/0177503 A1 | 9/2003 | Sull et al. |
| 2003/0182663 A1 | 9/2003 | Gudorf et al. |
| 2003/0187650 A1 | 10/2003 | Moore et al. |
| 2003/0229900 A1 | 12/2003 | Reisman |
| 2004/0003041 A1 | 1/2004 | Moore et al. |
| 2004/0015569 A1 | 1/2004 | Lonnfors et al. |
| 2004/0017389 A1 | 1/2004 | Pan et al. |
| 2004/0030750 A1 | 2/2004 | Moore et al. |
| 2004/0032486 A1 | 2/2004 | Shusman |
| 2004/0088289 A1 | 5/2004 | Xu et al. |
| 2004/0098754 A1 | 5/2004 | Vella et al. |
| 2004/0125124 A1 | 7/2004 | Kim et al. |
| 2004/0125877 A1 | 7/2004 | Chang et al. |
| 2004/0197088 A1 | 10/2004 | Ferman et al. |
| 2004/0227768 A1 | 11/2004 | Bates et al. |
| 2004/0231003 A1 | 11/2004 | Cooper et al. |
| 2004/0250272 A1 | 12/2004 | Durden et al. |
| 2005/0021784 A1 | 1/2005 | Prehofer |
| 2005/0028194 A1 | 2/2005 | Elenbaas et al. |
| 2005/0055713 A1 | 3/2005 | Lee et al. |
| 2005/0102202 A1 | 5/2005 | Linden et al. |
| 2005/0131906 A1 | 6/2005 | Shin |
| 2005/0251827 A1 | 11/2005 | Ellis et al. |
| 2005/0262542 A1 | 11/2005 | DeWeese et al. |
| 2006/0129544 A1 | 6/2006 | Yoon et al. |
| 2007/0011148 A1 | 1/2007 | Burkey et al. |

FOREIGN PATENT DOCUMENTS

| | | |
|---|---|---|
| EP | 0 878964 | 11/1998 |
| EP | 1250807 | 10/2002 |
| GB | 2 325 537 | 11/1998 |
| JP | 08125957 | 5/1996 |
| JP | 09322154 | 12/1997 |
| JP | 11-032267 | 2/1999 |
| JP | 11-261908 | 9/1999 |
| JP | 2000-013755 | 1/2000 |
| JP | 2001-036861 | 2/2001 |
| JP | 2002-503896 | 2/2002 |
| WO | WO 94/14284 | 6/1994 |
| WO | WO 98/56188 | 12/1998 |
| WO | WO 99/01984 | 1/1999 |
| WO | WO 99/04143 | 1/1999 |
| WO | WO 99/12194 | 3/1999 |
| WO | WO 99/65237 | 12/1999 |
| WO | WO 01/50753 | 7/2001 |

OTHER PUBLICATIONS

Michael G. Christel, Alexander G. Hauptmann, Adrienne S. Warmack, Scott A. Crosby; *Adjustable Filmstrips and Skims as Abstractions for a Digital Video Library*, Computer Science Depart. Carnegie Mellon University, Pittsburght PA; pp. 1-7.

Nuno Vasconcelos, Andrew Lippman, *Bayesian Modeling of Video Editing and Structure: Semantic Features for Video Summarization and Browsing*; 1998 IEEE Journal, 8186-8821—Jan. 1998.

Ken Masumitse, Tomio Echigo;*Video Summarization Using Reinforcement Learning in Eigenspace*; IBM Research, Tokyo Research Laboratory 1623-14, Shimotsuruma, Yamato-shi, Kanagawa, Japan.

"User Preference Description for MPEG-7," ISO/IEC JTC1/SC29/WG11, MPEG 99/MXXXX, Maui, Hawaii, Dec. 1999, pp. 1-18.

"A Proposal for User Preference Descriptions in MPEG-7," ISO/IEC JTC1SC29/WG11 M5222, MPEG 99, Oct. 4, 1999, pp. 1-6.

Peng Xu, et al., "Algorithms and System for High-Level Structure Analysis and Event Detection in Soccer Video," Columbia University, ADVENT—Technical Report #111, Jun. 2001.

Keith Millar and David White, "A Schema for TV-Anytime: Segmentation Metadata AN195," NDS Contribution from MyTV, NDS Limited 2000, 27 pages.

Keith Millar et al., "A Schema for TV-Anytime Segmentation Metadata AN195rl myTV project," NDS Systems Division, NDS Limited 2000, 28 pages.

S.E. Levinson, L. R. Rabiner, and M. M. Sondhi, "An Introduction to the Application of the Theory of Probabilistic Functions of a Markov Process to Automatic Speech Recognition," Copyright 1983 American Telephone and Telegraph company, The Bell system Technical Journal, vol. 62, No. 4, Apr. 1983, pp. 1035-1074.

Dennis Yow, et al., "Analysis and Presentation of Soccer Highlights from Digital Video," To appear in the Proceedings, Second Asian Conference on Computer Vision (ACCV '95).

Drew D. Saur, et al. "Automated Analysis and Annotation of Basketball Video," SPIE vol. 3022, pp. 176-187, 1997.

Hao Pan, et al., "Automatic Detection of Replay Segments in Broadcast Sports Programs by Detection of Logos in Scene Transitions," 2002 IEEE, pp. IV-3385-IV-3388.

Yihong Gong, et al., "Automatic Parsing of TV soccer Programs," 1995 IEEE, pp. 167-174.

Jonathan D. Courtney, "Automatic Video Indexing via Object Motion Analysis," Pattern Recognition, vol. 30, No. 4, pp. 607-625, 1997.

Yong Rui, et al. "Automatically Extracting Highlights for TV Baseball Programs," ACM Multimedia 2000 Los Angeles, CA, USA, pp. 105-115.

Padhraic Smyth, "Belief Networks, Hidden Markov Models, and Markov Random Fields: a Unifying View," To appear in Pattern Recognition Letters, 1998, Information and Computer Science Department, University of California, Irvine, CA 92697-3425, Mar. 20, 1998.

Francis C. Li et al., "Browsing Digital Video," CHI 2000 Apr. 1-6, 2000, CHI Letters vol. 2 issue 1. pp. 169-176.

Franklin Reynolds, et al. "Composite Capability/Preference Profiles (CC/PP): A user side framework for content negotiation," W3C Note Jul. 27, 1999, http://www.w3.org/1999/07/NOTE-CCPP-19990727/, 15 pages.

T. Lambrou, et al., "Classification of Audio Signals Using Statistical Features on Time and Wavelet Transform Domains," IEEE, pp. 3621-3624.

Joshua Alspector,et al., "Comparing Feature-based and Clique-based User Models for Movie Selection," Digital Libraries 98, Pittsburgh, PA, Copyright ACM 1998, pp. 11-18.

Rainer Lienhart, "Comparison of Automatic Shot Boundary Detection Algorithms," Part of the IS&T/SPIE conference on Storage and Retrieval for Image and Video Databases VII, San Jose, CA, Jan. 1999, SPIE vol. 3656, pp. 290-301.

John Canny, "A Computational Approach to Edge Detection," IEEE Transactions on Pattern Analysis and Machine Intelligence, vol. PAMI-8, No. 6, Nov. 1986, IEEE 1986, pp. 679-698.

Richard Qian et al., "A Computational Approach to Semantic Event Detection," 1999 IEEE, pp. 200-206.

F. Arman, et al., "Content-based Browsing of Video Sequences," to appear in the Proceedings of ACM International Conference on Multimedia '94, Oct. 15-20, San Francisco, CA, 7 pages.

Hongjiang Zhang, et al. "Content-Based Video Browsing Tools," SPIE vol. 2417, 1995, pp. 389-398.

Stephen W. Smoliar, et al. "Content-Based Video Indexing and Retrieval," 1994 IEEE, pp. 62-72.

Stefan Eickeler, et al., "Content-based Video Indexing of TV Broadcast News Using Hidden Markov Models," Proceedings of IEEE International Conference on Acoustics, Speech, and Signal Processing, Phoenix, AZ, 1999, 4 pages.

Kathy Bohrer and Bobby Holland, editors, "Customer Profile Exchange (CPExchange) Specification," Oct. 20, 2000, Version 1.0, International digital Enterprise Alliance, Inc. (IDEAlliance), pp. 1-127.

Jane Hunter (DSTC Pty Ltd), Editor, "DDL Working Draft 3.0," ISO/IEC JTC1/SC29/WG11 N3391, MPEG 00/ May 2000 (Geneva), 23 pages.

Vikrant Kobla, et al. "Detection of Slow-Motion Replay Sequences for Identifying Sports Videos," Laboratory for Language and Media Processing, University of Maryland, College Park, MD 20742-3275, USA, 6 pages.

Richard J. Qian, et al. "Description Schemes for Consumer Video Applications," Proposal ID 429, ISO/IEC JTC1/SC29/WG11—MPEG-7 Proposal, Feb. 1999.

Zhu Liu and Qian Huang, "Detecting News Reporting Using Audio/Visual Information," 1999 IEEE, pp. 324-328.

Y Kawai, "Detection of Replay Scenes in Broadcasted Sports Video by focusing on digital Video Effects," IEICE (D-II), vol. J84-D-II, No. 2, pp. 432-435, Feb. 2001, (in Japanese), pp. 432-437.

Vikrant Kobla, et al., "Detection of Slow-Motion Replay Sequences for Identifying Sports Videos," Laboratory for Language and Media Processing, University of Maryland, College Park, MD 20742-3275, USA, pp. 135-140.

H. Pan, at al. "Detection of Slow-Motion Replay Segments in sports Video for Highlights Generation," Proceedings of IEEE International Conference on Acoustics, Speech, and signal Processing, Salt Lake City, UT, 2001, 4 pages.

Alan E Bell, "The dynamic digital disk," IEEE Spectrum, Oct. 1999, pp. 28-35.

Baoxin Li and M. Ibrahim Sezan, "Event Detection and Summarization in Sports Video," Sharp Laboratories of America, 5750 NW Pacific Rim Blvd., Camas, WW 98607, USA, 5 pages.

Minerva Yeung, "Extracting Story Units from Long Programs for Video Browsing and Navigation," Proceedings of Multimedia 1996, 1996 IEEE, pp. 296-304.

Boon-Lock Yeo et al., "On the Extraction of DC Sequence from MPEG Compressed Video," 1995 IEEE, pp. 260-263.

FAP Specifications, MPEG-4 Compliant Facial Animation, http://www.dsp.dist.unige.it/~pok/RESEARCH/MPEG/fapspec.htm, 4 pages.

Frank R. Kschischang, et al., "Factor Graphs and the Sum-Product Algorithm," IEEE Transactions on Information Theory, vol. 47, No. 2, Feb. 2001, pp. 498-519.

John S. Boreczky, et al. "A Hidden Markov Model Framework for Video Segmentation Using Audio and Image Features," Proceedings of IEEE International Conference on Acoustics, Speech, and Signal Processing, Seattle, WA, 1998, 4 pages.

Wayne Wolf, "Hidden Markov Model Parsing of Video Programs," Proceedings of the 1997 IEEE International Conference on Acoustics, Speech, and Signal Processing (ICASSP '97), pp. 2609-2611.

Bilge Gunsel, et al., "Hierarchical Temporal video Segmentation and content Characterization," Dept. of Electrical Engineering and Center for Electronic Imaging Systems, University of Rochester, Rochester, NY 14627, SPIE vol. 3229, 1997.

M. R. Naphade, et al. "A High-Performance Shot Boundary Detection Algorithm Using Multiple Cues," Proceedings of IEEE International Conference on Image Processing, Chicago, IL, 1998, pp. 884-887.

Josh Bernoff, "How Cable TV Can Beat Satellite," WholeView TechStrategy Rsearch, Apr. 2002 Forrester Research, Inc., 400 Technology Square, Cambridge, MA 02139 USA.

Vikrant Kobla, et al., "Identifying sports videos using replay, text, and camera motion features," Laboratory for Language and Media Processing, University of Maryland, College Park, MD 20742-3275, USA, Date Unknown.

B. B. Chaudhuri, et al., "Improved fractal geometry based texture segmentation technique," IEE Proceedings—E, vol. 140, No. 5, Sep. 1993, pp. 233-241.

Toshio Kawashima, et al., "Indexing of Baseball Telecast for Content-based Video Retrieval," Dept. of Information engineering, Hokkaido University, Kita-13, Nishi-8, Sapporo, 060-8628, Japan, 1998 IEEE, pp. 871-874.

Nathaniel J. Thurston, et al. "Intelligent Audience guidance: The New Paradigm in Television Navigation," Predictive Networks, Inc., Feb. 21, 2002, 9 pages.

Dulce Ponceleon, et al. "Key to Effective Video Retrieval: Effective Cataloging and Browsing," ACM Multimedia '98, Bristol, UK, 1998, pp. 99-107.

Henry Lieberman, et al. "Let's Browse: A collaborative Web Browsing Agent," Massachusetts Institute of Technology, 20 Ames Street #E15-305, Cambridge, MA 02139, USA, Copyright ACM 1999, pp. 65-68.

Noboru Babaguchi, et al., "Linking Live and Replay Scenes in Broadcasted Sports Video," ACM Multimedia Workshop, Marina Del Rey, CA, USA, Copyright ACM 2000, pp. 205-208.

Giridharan Iyengar, et al., "Models for automatic classification of video sequences," SPIE vol. 3312, 1997, pp. 216-227.

Nevenka Dimitrova, et al., "Motion Recovery for Video Content Classification," ACM Transactions on Information Systems, vol. 13, No. 4, Oct. 1995, pp. 408-439.

DDL Group, "MPEG-7 Description Definition Language Document V 2," ISO/IEC JTC1/SC29/WG11/N2997, Oct. 1999/Melbourne, 56 pages.

Description Scheme Group, "MPEG-7 Description Schemes (V0. 5)," ISO/IEC JTC1/SC29/WG11 N2844, MPEG 99, Jul. 1999, Vancouver, pp. 1-59.

Description Scheme Group, "MPEG-7 Generic AV Description Schemes (V0.7)," MPEG 99, Oct. 1999, Melbourne.

AHG on MPEG7 Media/Meta DSs and Harmonization with other Schemes, "MPEG-7 Media/Meta DSs upgrade (V0.2)," ISO/IEC JTC1/SC29/WG11 MXXXX, MPEG 99 Oct. 1999, Melbourne, pp. 1-17.

Peter Van Beek, et al, Editors, "MPEG-7 Multimedia Description Schemes WD (Version 3.0)," ISO/IEC JTC 1/SC 29/WG 11/N3411, May 2000, Geneva.

Peter Van Beek, et al., Editors, "MPEG-7 Multimedia Description Schemes XM (Version 3.0)," ISO/IEC JTC 1/SC29/WG 11/N3410, May 2000, Geneva.

P. Van Beek et al., "MPEG-7 Requirements for Description of Users," ISO/IEC JTC1/SC29/WG11, MPEG99/4601, Mar. 1999, 5 pages.

F. Pereira, Editor, "MPEG-7 Requirements Document V.9," ISO/IEC JTC1/SC29/WG11/N2859, Jul. 1999/Vancouver (Canada).

Sylvie Jeannin, et al., Editors, "MPEG-7 Visual part of eXperimentation Model Version 6.0," ISO/IEC JTC1/SC29/WG11/N3398, Geneva, Jun. 2000.

Kaushal Kurapati, et al., "A Multi-Agent TV Recommender," Adaptive Systems Department, Philips Research Briarcliff, 345 Scarborough Rd., Briarcliff Manor, NY 10510, USA, Date Unknown.

Jane Hunter (DSTC Pty Ltd.), "Text of ISO/IEC CD 15938-2 Information technology—Multimedia content description interface—Part 2 Description definition language," ISO/IEC JTC1/SC29/WG11 N3702, MPEG 00/3702, Oct. 2000 (La Baule).

"Information Technology—Multimedia Content Description Interface—Part 5: Multimedia Description Schemes," ISO/IEC JTC 1/SC 29 N 3705, Nov. 17, 2000, ISO/IEC CD 15938-5.

Peter Van Beek, et al., "Text of 15938-5 FCD Information Technology—Multimedia Content Description Interface—Part 5 Multimedia Description Schemes," ISO/IEC JTC 1/SC 29 N3966 Mar. 12, 2001, 500 pages.

Yao Wang, et al., "Multimedia Content Analysis," IEEE Signal Processing Magazine, Nov. 2000, pp. 12-35.

Mark T. Maybury, et al., "Multimedia Summaries of Broadcast News," Advanced Information Systems Center, The MITRE Corporation, 202 Burlington Road, Bedford, MA 01730, USA, pp. 442-449.

Shinichi Satoh, et al., "Name-It: Association of Face and Name in Video," School of Computer Science, Carnegie Mellon University, Pittsburgh, PA 15213, Dec. 20, 1996, 19 pages.

Stuart J. Golin, "New metric to detect wipes and other gradual transitions in . . . " Part of the IS&T/SPIE Conference on Visual communications and Image Processing '99, San Jose, CA Jan. 1999, SPIE vol. 3653, pp. 1464-1474.

Ullas Gargi, et al., "Transactions Letters: Performance Characterization of Video-Shot-Change Detection Methods," IEEE Transactions on Circuits and Systems for Video Technology, vol. 10, No. 1, Feb. 2000, 13 pages.

Michael Ehrmantraut, et al., "The Personal Electronic Program guide—Towards the Pre-selection of Individual TV Programs," 1996 ACM, pp. 243-250.

Marc Light, et al., "Personalized Multimedia Information Access," Communications of the ACM, vol. 45, No. 5, May 2002, pp. 54-59.

Kyoungro Yoon, et al., "Proposal of Usage History DS," ISO/IEC JTC1/SC29/WG11, MPEG00/M6259, Jul. 2000, Beijing.

Michael T. Chan, et al., "Real-Time Lip Tracking and Bimodal Continuous Speech Recognition," Rockwell Science Center, 1049 Camino Dos Rios, Thousand Oaks, CA 91360, 6 pages, date unknown.

Boon-Lock Yeo, et al., "Retrieving and Visualizing Video," Communications of the ACM, Dec. 1997, vol. 40, No. 12, pp. 43-52.

H.B. Lu, et al., "Robust Gradual Scene Change Detection," Proceedings of IEEE International Conference on Image Processing, Kobe, Japan, 1999, 5 pages.

Richard J. Qian, et al., "A Robust Real-Time Face Tracking Algorithm," Sharp Laboratories of America, 5750 N.W. Pacific Rim Blvd., Camas, WA 98607, 1998 IEEE, pp. 131-135.

Lexing Lie, "Segmentation and Event Detection in Soccer Audio," EE 6820 Project, Soccer Audio, May 15, 2001, 9 pages.

Riccardo Leonardi, et al., "Content-Based Multimedia Indexing and Retrieval: Semantic Indexing of Multimedia Documents," IEEE 2002, pp. 44-51.

R. W. Picard, "A Society of Models for Video and Image Libraries," IBM Systems Journal, vol. 35, Nos. 3 & 4, 1996, pp. 292-312.

Alberto Del Bimbo, et al., "A Spatial Logic for Symbolic Description of Image Contents," Journal of Visual Languages and Computing (1994) 5, pp. 267-286.

Jin-Soo Lee, et al. Editors, "Specification of the UsageHistory DS," ISO/IEC JTC 1/SC 29/WG 11/M5748, Mar. 2000, Noordwijkerhout, pp. 1-6.

Lexing Xie, et al., "Structure Analysis of Soccer Video with Hidden Markov Models," Department of Electrical Engineering, Columbia University, New York, NY, 4 pages.

Selim Aksoy, et al., "Textural Features for Image Database Retrieval," Intelligent Systems Laboratory, Department of Electrical Engineering, University of Washington, Seattle, WA 98195-2500, 5 pages.

B. S. Manjunath, et al., "Texture Features for Browsing and Retrieval of Image Data," IEEE Transactions on Pattern Analysis and Machine Intelligence, vol. 18, No. 8, Aug. 1996, pp. 837-842.

Richard W. Conners, et al., "A Theoretical comparison of Texture Algorithms," IEEE Transactions on Pattern Analysis and Machine Intelligence, vol. PAMI-2, No. 3, May 1980, pp. 204-222.

Noboru Babaguchi, "Towards Abstracting Sports Video by Highlights," ISIR, Osaka University, Ibaraki, Osaka 567-0047, Japan, 2000 IEEE, pp. 1519-1522.

Stephen S. Intille, "Tracking Using a Local Closed-World Assumption: Tracking in the Football Domain," MIT Media Lab Perceptual computing group Technical Report No. 296, pp. 1-62.

Lawrence R. Rabiner, "A Tutorial on Hidden Markov Models and Selected Applications in Speech Recognition," Proceedings of the IEEE, vol. 77, No. 2, Feb. 1989, pp. 257-286.

Jim Stroud, "TV Personalization: A Key Component of Interactive TV," The Carmel Group, 2001, 9 pages.

Ted Lewis, "UbiNet: The Ubiquitous Internet Will Be Wireless,"DaimlerChrysler Research & Technology North America, 3 pages, date unknown.

Richard O. Duda et al., "Use of the Hough Transformation to Detect Lines and Curves in Pictures," Communications of the ACM, Jan. 1972, vol. 15, No. 1, pp. 11-15.

"User Preference Descriptions for MPEG-7," ISO/IEC JTC1/SC29/WG11, MPEG 99/MXXXX, Maui, Hawaii, Dec. 1999, pp. 1-18.

Rainer Lienhart, et al., "Video Abstracting," Communications of the ACM, Dec. 1997/ vol. 40, No. 12, pp. 55-62.

Shingo Uchihashi, et al., "Video Manga: Generating Semantically Meaningful Video Summaries,"FX Palo Alto Laboratory, 3400 Hillview Avenue, Palo Alto, CA 94304, USA, pp. 383-392.

Michael A. Smith, et al., "Video Skimming for Quick Browsing based on Audio and Image Characterization," School of Computer Science, Carnegie Mellon University, Pittsburgh, PA 15213, Jul. 30, 1995, 24 pages.

Daniel Dementhon, et al., "Video summarization by Curve Simplification," Language and Media Processing (LAMP), University of Maryland, College Park, MD 20742-3275, 1998 ACM, pp. 211-218.

Chung-Lin Huang, et al., "Video summarization using Hidden Markov Model," Electrical Engineering Department, National Tsing-Hua University, Hsin-Chu, Taiwan, ROC, 2001 IEEE, pp. 473-477.

Yihong Gong, et al., "Video Summarization Using Singular Value Decomposition," C&C Research laboratories, NEc USA, Inc. 110 Rio Robles, San Jose, CA 95134, USA, 2000 IEEE, 7 pages.

Yihong Gong, et al., "Video Summarization with Minimal Visual Content Redundancies," C&C Research Laboratories, NEC USA, Inc., 110 Rio robles, San Jose, CA 95134, USA, 2001 IEEE, pp. 362-365.

Minerva M. Yeung, et al., "Video visualization for Compact Presentation and Fast Browsing of Pictorial Content," IEEE Transactions on circuits and Systems for Video Technology, vol. 7, No. 5, Oct. 1997, pp. 771-785.

Stephen S. Intille, et al., "Visual Tracking Using closed-Worlds,", MIT Media Laboratory Perceptual computing Section Technical Report No. 294, Nov. 1994, pp. 1-18.

Leszek Cieplinski, et al. "Visual Working Draft 3.0," ISO/IEC JTC1/SC29/WG11/N3399, Jun. 2000 (Geneva), 92 pages.

Sunghoon Choi, et al., "Where are the ball and players?: Soccer Game Analysis with Color-based Tracking and Image Mosaick," Dept. of EE, Pohang University of Science and Technology, San 31 Hyoja Dong, Pohang, 790-784, Republic of Korea, pp. 1-15.

http://web.archive.org/web/20001017172449/http://www.pvi-inc.com/.

David Beech, et al., editors, "XML Schema Part 1: Structures," http://www.w3.org/1999/05/06-xmlschema-1/, W3C Working Draft, May 6, 1999, 67 pages.

Paul V. Birch, et al., editors, "SML Schema Part 2: Datatypes, World Wide Web Consortium Working Draft," May 6, 1999, http://www.w3.org/1999/05/06-xmlschema-2/, 37 pages.

Yuichi Yagawa et al., "TV Program Planning Agent using Analysis Method of User's Taste", Technical report of IEICE, vol. 98, No. 437, AI98-54-61, Dec. 1, 1998.

* cited by examiner

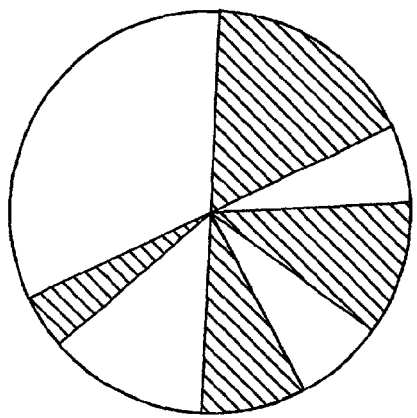
FIG. 2
FIG. 3
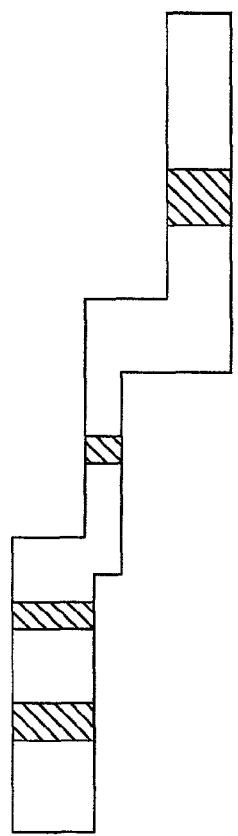
FIG. 4
☐ STRONG SENSE
☐ MILD SENSE
☐ WEAK SENSE
☐ NO SENSE
FIG. 7

☐ INNINGS — 80
  ☐ TEAM AT BAT — 82
    ☐ PLAYER AT BAT
      ☐ STATISTICS
      ☐ HITTING PLAYS — 84
      ☐ STEALS — 84
      ☐ STRIKE OUTS — 84

* — AUDIO

SYSTEM FOR PRESENTING AUDIO-VIDEO CONTENT

BACKGROUND OF THE INVENTION

This application claims the benefit of U.S. Patent Application Ser. No. 60/285,553 filed Apr. 19, 2001; U.S. Patent Application Ser. No. 60/297,091 filed Jun. 7, 2001; and U.S. Patent Application Ser. No. 60/329,771 filed Oct. 16, 2001.

The present invention relates to viewing audio-video content.

The amount of video content is expanding at an ever increasing rate, some of which includes sporting events. Simultaneously, the available time for viewers to consume or otherwise view all of the desirable video content is decreasing. With the increased amount of video content coupled with the decreasing time available to view the video content, it becomes increasingly problematic for viewers to view all of the potentially desirable content in its entirety. Accordingly, viewers are increasingly selective regarding the video content that they select to view. To accommodate viewer demands, techniques have been developed to provide a summarization of the video representative in some manner of the entire video. Video summarization likewise facilitates additional features including browsing, filtering, indexing, retrieval, etc. The typical purpose for creating a video summarization is to obtain a compact representation of the original video for subsequent viewing.

There are two major approaches to video summarization. The first approach for video summarization is key frame detection. Key frame detection includes mechanisms that process low level characteristics of the video, such as its color distribution, to determine those particular isolated frames that are most representative of particular portions of the video. For example, a key frame summarization of a video may contain only a few isolated key frames which potentially highlight the most important events in the video. Thus some limited information about the video can be inferred from the selection of key frames. Key frame techniques are especially suitable for indexing video content.

The second approach for video summarization is directed at detecting events that are important for the particular video content. Such techniques normally include a definition and model of anticipated events of particular importance for a particular type of content. The video summarization may consist of many video segments, each of which is a continuous portion in the original video, allowing some detailed information from the video to be viewed by the user in a time effective manner. Such techniques are especially suitable for the efficient consumption of the content of a video by browsing only its summary. Such approaches facilitate what is sometimes referred to as "semantic summaries".

There are numerous computer based editing systems that include a graphical user interface. For example, U.S. Pat. No. 4,937,685 discloses a system that selects segments from image source material stored on at least two storage media and denote serially connected sequences of the segments to thereby form a program sequence. The system employs pictorial labels associated with each segment for ease of manipulating the segments to form the program sequence. The composition control function is interactive with the user and responds to user commands for selectively displaying segments from the source material on a pictorial display monitor. The control function allows the user to display two segments, a "from" segment and a "to" segment, and the transition there between. The segments can be displayed in a film-style presentation or a video-style presentation directed to the end frame of the "from" segment and the beginning frame of the "to" segment. The system can selectively alternate between the film-style and video-style presentation. Such a system is suitable for a video editing professional to edit image source material and view selected portions of the image in a film-style or video-style presentation. However, such a system is ineffective for consumers of such video content to view the content of the source material in an effective manner.

BRIEF DESCRIPTION OF THE DRAWINGS

FIG. 2 is an exemplary illustration of an alternative time line.

FIG. 3 is an exemplary illustration of another alternative time line.

FIG. 4 is an exemplary illustration of yet another alternative time line.

FIG. 7 illustrates different presentation modes.

DETAILED DESCRIPTION OF THE PREFERRED EMBODIMENT

Figure 1:
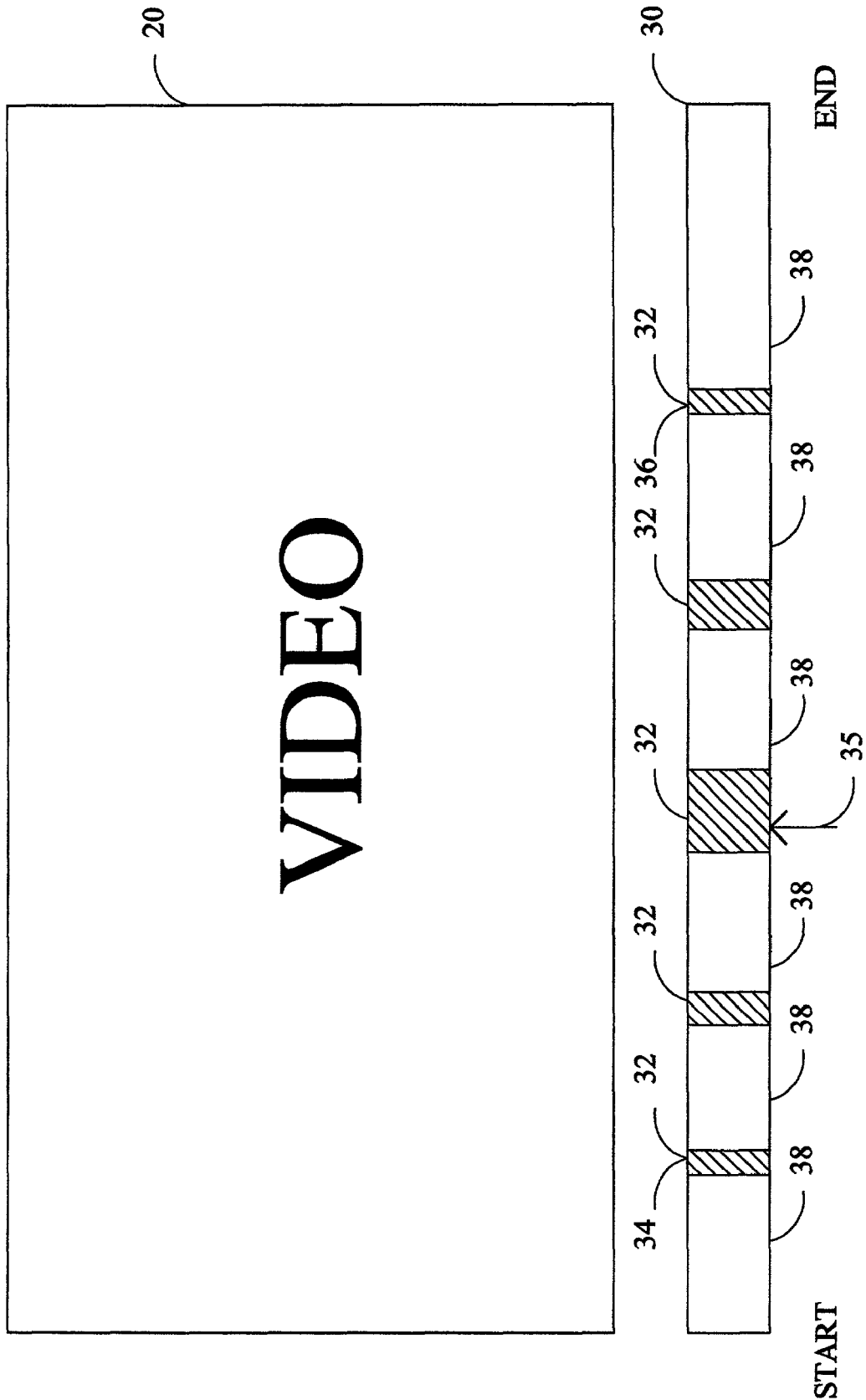
FIG. 1 is an exemplary illustration of a graphical user interface for presenting video and a time line.

A typical football game lasts about 3 hours of which only about one hour turns out to include time during which the ball is in action. The time during which the ball is in action is normally the exciting part of the game, such as for example, a kickoff, a hike, a pass play, a running play, a punt return, a punt, a field goal, etc. The remaining time during the football game is typically not exciting to watch on video, such as for example, nearly endless commercials, the time during which the players change from offense to defense, the time during which the players walk onto the field, the time during which the players are in the huddle, the time during which the coach talks to the quarterback, the time during which the yardsticks are moved, the time during which the ball is moved to the spot, the time during which the spectators are viewed in the bleachers, the time during which the commentators talk, etc. While it may indeed be entertaining to sit in a stadium for three hours for a one hour football game, many people who watch a video of a football game find it difficult to watch all of the game, even if they are loyal fans. A video summarization of the football video, which provides a summary of the game having a duration shorter than the original football video, may be appealing to many people. The video summarization should provide nearly the same level of the excitement (e.g. interest) that the original game provided.

It is possible to develop models of a typical football video to identify potentially relevant portions of the video. Desirable segments of the football game may be selected based upon a "play". A "play" may be defined as an sequence of events defined by the rules of football. In particular, the sequence of events of a "play" may be defined as the time generally at which the ball is put into play (e.g., a time based upon when the ball is put into play) and the time generally at which when the ball is considered out of play (e.g., a time based upon when the ball is considered out of play). Normally the "play" would include a related series of activities that could potentially result in a score (or a related series of activities that could prevent a score) and/or otherwise advancing the team toward scoring (or prevent advancing the team toward scoring).

An example of an activity that could potentially result in a score, may include for example, throwing the ball far down field, kicking a field goal, kicking a point after, and running the ball. An example of an activity that could potentially result in preventing a score, may include for example, intercepting the ball, recovering a fumble, causing a fumble, dropping the ball, and blocking a field goal, punt, or point after attempt. An example of an activity that could potentially advance a team toward scoring, may be for example, tackling the runner running, catching the ball, and an on-side kick. An example of an activity that could potentially prevent advancement a team toward scoring, may be for example, tackling the runner, tackling the receiver, and a violation. It is to be understood that the temporal bounds of a particular type of "play" does not necessarily start or end at a particular instance, but rather at a time generally coincident with the start and end of the play or otherwise based upon, at least in part, a time (e.g., event) based upon a play. For example, a "play" starting with the hiking the ball may include the time at which the center hikes the ball, the time at which the quarterback receives the ball, the time at which the ball is in the air, the time at which the ball is spotted, the time the kicker kicks the ball, and/or the time at which the center touches the ball prior to hiking the ball. A summarization of the video is created by including a plurality of video segments, where the summarization includes fewer frames than the original video from which the summarization was created. A summarization that includes a plurality of the plays of the football game provides the viewer with a shortened video sequence while permitting the viewer to still enjoy the game because most of the exciting portions of the video are provided, preferably in the same temporally sequential manner as in the original football video. Other relevant portions of the video may likewise be identified in some manner. Other types of content, such as baseball, are likewise suitable for similar summarization including the identification of plays.

The present inventors considered the aforementioned identification of a "play" from a video and considered a traditional presentation technique, namely, creation of another video by concatenation of the "play" segments into a single sequence for presentation to the user. In essence, such techniques mask any underlying description data regarding the video, such as data relating to those portions to include, and provide an extracted composite. The data may be, for example, time point/duration data and structured textual or binary descriptions (e.g., XML documents that comply with MPEG-7 and TV-Anytime standards). While suitable for passive viewing by a user, the present inventors consider such a presentation to be inadequate for effective consumption of audiovisual material by a user. The user does not have the ability to conceptualize the identified subset of the program in the context of the full program. This is important for the user, because they should create a mental model of the temporal event relationships of the program that they are consuming (e.g., watching). For example, viewing a simple composite of a slam-dunk summary is a limited experience for viewing a sequence of events. In particular, the present inventors consider that a graphical user interface illustrating the temporal information regarding the location of the video segments within the original video enhances the viewing experience of the user and provides an improved dimension to the viewing experience.

Referring to FIG. 1, the system may present the video content to the user in one or more windows 20 and may present a corresponding time line 30, which may be referred to generally as temporal information, representative of the entire video or a portion thereof with the identified play segments 32 or otherwise identified thereon. The segments 32 may relate to any particular type of content, such as for example, interesting events, highlights, plays, key frames, events, and themes. A graphical indicator 35 illustrates where in the time line 30 corresponds with the presently displayed video. The system may present the play segments 32 in order from the first segment 34 to the last segment 36. The regions between the play segments 32 relates to non-play regions 38, which are typically not viewed when presenting a summarization of the video consisting of play segments 32. The time line 30 may be a generally rectangular region where each of the plurality of segments 32 is indicated within the generally rectangular region, preferably with the size of each of the plurality of segments indicated in a manner such that the plurality of segments with a greater number of frames are larger than the plurality of segments with a lesser number of frames. Also, the size of the regions 38 between each of the plurality of segments may be indicated in a manner such that the regions 38 with a greater number of frames are larger than segments and regions with a lesser number of frames. Moreover, the size of each region 38 and segments 32 are preferably generally consistent with the length of time of the respective portions of the video. The indicator changes location relative to the time line as the currently displayed portion of the video changes.

In an alternative embodiment, the relevant segments may be identified in any manner and relate to any parts of the video that are potentially of interest to a viewer with the total of the identified segments being less than the entire video. In essence, a plurality of segments of the video are identified in some manner. Referring to FIGS. 2, 3, and 4, alternative representations of the time line 30 for the video and segments of potential interest are illustrated.

While the described system is suitable for indicating those portions of the video that are likely desirable for the user, the particular type of content that the time line indicates is unknown to the viewer. For example, during a basketball game the time line may select a large number of good defensive plays and only a few slam dunks. However, the particular viewer may be more interested in the slam dunks, and accordingly, will have to watch a significant series of undesired good defensive plays in order to watch the few slam dunks. Moreover, the system provides the viewer with no indication of when such slam dunks may occur, or whether all of the slam dunks for a particular video have already occurred. To overcome this limitation, the present inventors came to the realization that the time line should not only indicate those portions that are potentially desirable for the viewer, but also provide some indication of what type of content is represented by different portions of the time line. The indication may indicate simply that different portions relate to different content, without an identification of the content itself.

Figure 5:
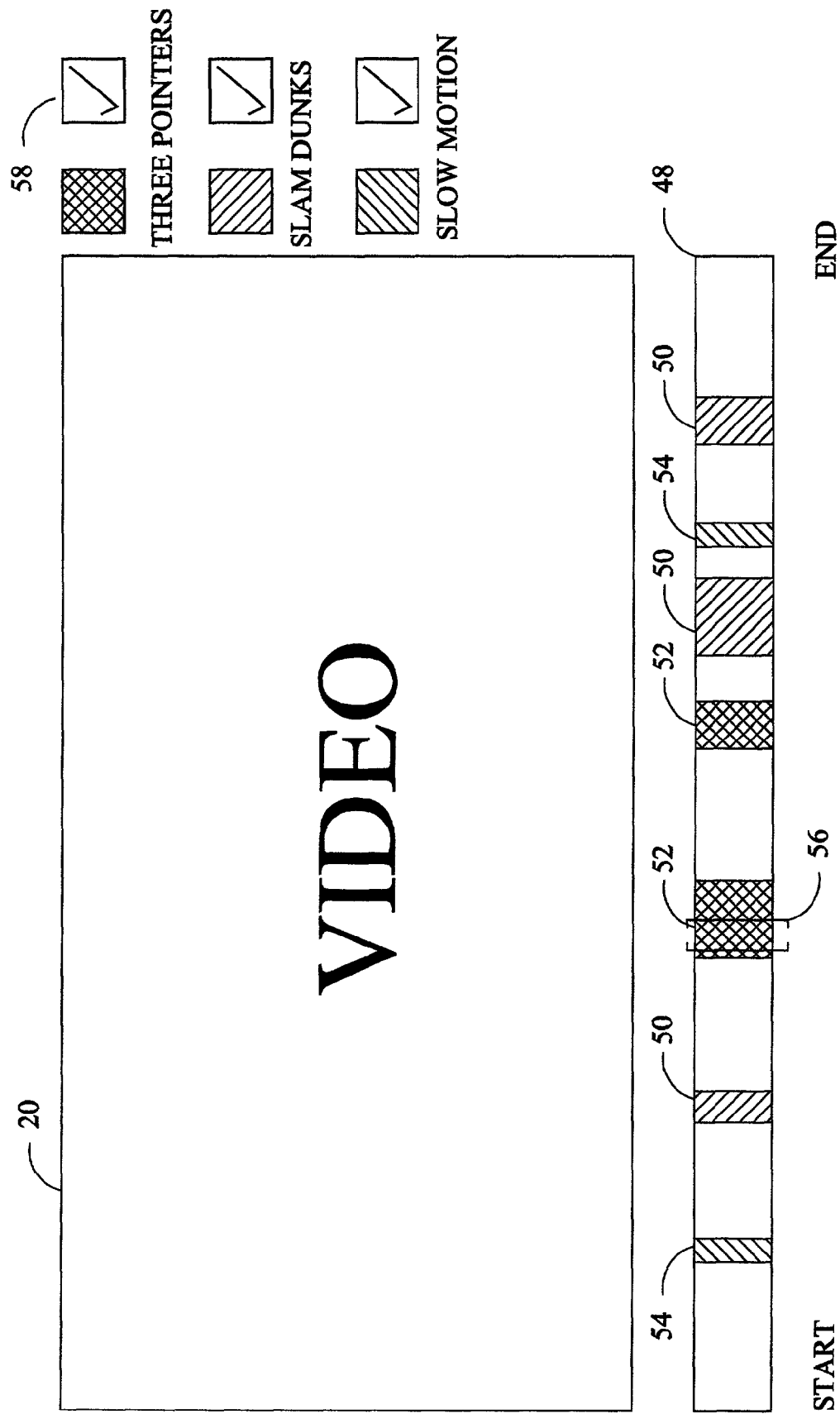
FIG. 5 is an exemplary illustration of another graphical user interface for presenting video and a time line.

Referring to FIG. 5, the time line 48 may indicate a first type of content with first visual indications 50, a second type of content with second visual indications 52, and a third type of content with third visual indications 54. Additional visual indications may likewise be used, if desired. Moreover, the indications may be provided in any visually identifiable manner, such as color, shade, hatching, blinking, flashing, outlined, normal bands, grey scale bands, multi-colored bands, multi-textured bands, multi-height bands, etc. To provide further interactivity with the video, the system may provide a selectable indicator 56 that indicates the current position within the time line, which may be referred to generally as temporal information, of a currently displayed portion of the video. This permits the user to have a more accurate mental model of the temporal-event relationships of the program they are viewing and interact therewith.

The selectable indicator 56 changes location relative to the time line 48 as the currently displayed portion of the video changes. The user may select the selectable indicator 56, such as by using a mouse or other pointing device, and move the selectable indicator 56 to a different portion of the video. Upon moving the selectable indicator 56, the video being presented changes to the portion of the video associated with the modified placement of the selectable indicator 56. This permits the user to select those portions of the video that are currently of the greatest interest and exclude those that are less desirable. The user may modify the location of the selectable indicator 56 to any other location on the time line 48, including other indicated portions 50, 52, 54, and the regions in between. Typically, the presentation of the video continues from the modified location.

The system may include a set of selectors 58 that permits the user to select which portions of the video should be included in the summarized presentation. For example, if the slow motion segments are not desired, then the user may unselect the slow motion box 58 and the corresponding slow motion regions of the time line 48 will be skipped during the summary presentation. However, it is preferred that the slow motion portions are still indicated on the time line 48, while not presented to the user in the summary presentation.

Figure 6:
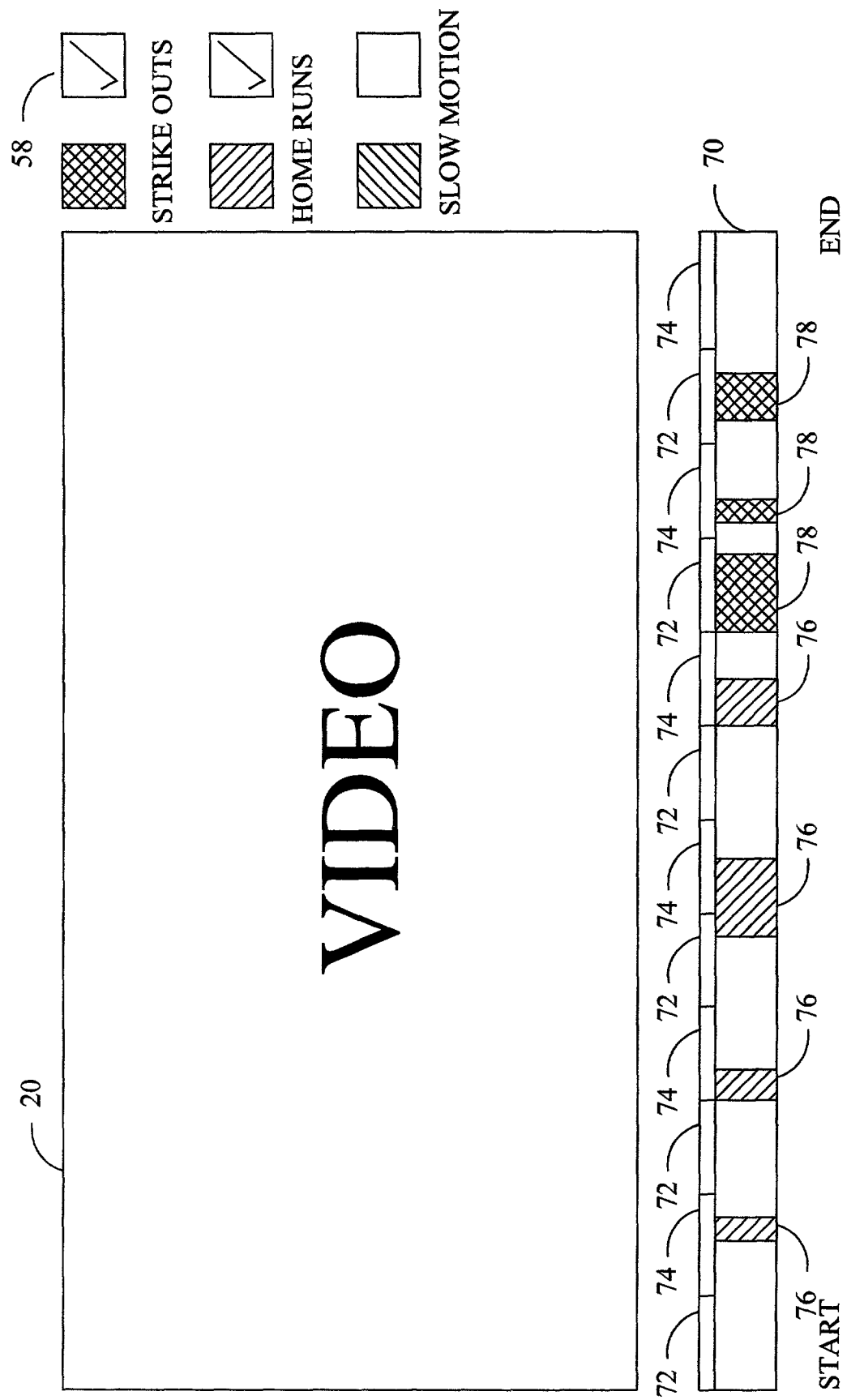
FIG. 6 is an exemplary illustration of a graphical user interface for modifying the presentation of the video.

Referring to FIG. 6, a time line 70 may include layered visual bands. The layered visual bands may indicate overlapping activities (e.g., two different characterizations of the content of the video that are temporally overlapping), such as for example, the team that is in possession of the ball and the type of play that occurred, such as a slam dunk. For purposes of illustration, indicated portions 72 may be team A in possession and indicated portions 74 may be team B in possession. Also, the indicated portions 76 and 78 may be representative of different types of content.

The potential importance of displaying multiple different types of content, each having a visually distinguishable identifier, within the context of the video may be illustrated by the following example. Three point summary segments in the game of basketball made toward the end of the game have more significance, and the possession summary provides the user context about each of the three point segments without having to view the preceding portions. In essence, the three point segments reveal limited contextual information, but taken in combination with the entire program time line and overlaid "possession" summary, the summary provides a context to support the temporal-event relationship model.

As previously indicated, the interface may support changing the current playback position of the video. More than merely permitting the user to select a new position in the video, the present inventors determined that other navigational options may be useful in the environment of presenting audiovisual materials. The other navigational modes should correspond to a consistent set of behaviors.

Referring to FIG. 7, the system may include a strong sense mode which, if selected, modifies the functionality of the selectable indicator 56. In the strong sense mode, the user may modify the location of the selectable indicator 56 to another position. In the event that the user selects a location within a region between the indicated segments, the system automatically relocates the selectable pointer 56 to the closest start of the indicated segments. Alternatively, the system may automatically relocate the selectable pointer 56 to the next indicated segment, or the previous indicated segment. In the event that the user selects a location within an indicated segment, the system automatically relocates the selectable pointer 56 to the start of the indicated segment. In essence, the system assists the user in relocating the selectable pointer 56 to the start of one of the indicated segments. After viewing the selected indicated segment, the system goes to the next indicated segments, and so on, until presenting the last temporally indicated segment. In this manner the regions between the indicated segments will not be inadvertently viewed. This is also useful for summaries of short events occurring in a relatively long video, because the resolution of the cursor may make it difficult to manually position the indicator to the beginning of a segment.

The system may also include a mild sense mode which, if selected, modifies the functionality of the selectable indicator 56. In the mild sense mode, the user may modify the location of the selectable indicator 56 to another position. In the event that the user selects a location within a region between the indicated segments, the system automatically relocates the selectable pointer 56 to the closest start of the indicated segments. Alternatively, the system may automatically relocate the selectable pointer 56 to the next indicated segment, or the previous indicated segment. In the event that the user selects a location within an indicated segment, the system does not relocate the selectable pointer 56 within the indicated segment. In essence, the system assists the user in relocating the selectable pointer 56 to the start of one of the indicated segments if located between indicated segments and otherwise does not relocate the indicator. After viewing the selected indicated segment, the system goes to the next indicated segments, and so on, until presenting the last temporally indicated segment. In this manner the regions between the indicated segments will not be inadvertently viewed. This is also useful for summaries of reasonably long events occurring in a relatively long video, because the viewer may not desire to view the entire event.

The system may also include a weak sense mode which, if selected, modifies the functionality of the selectable indicator 56. In the weak sense mode, the user may modify the location of the selectable indicator 56 to another position. In the event that the user selects a location within a region between the indicated segments, the system does not relocate the selectable pointer 56 to the closest start of the indicated segments. In the event that the user selects a location within an indicated segment, the system does not relocate the selectable pointer 56 within the indicated segment. In essence, the system does not assists the user in relocating the selectable pointer 56 to the start of one of the indicated segments nor relocates the selectable pointer 56 within the region between indicated segments. After viewing the selected indicated segment, or otherwise the region between the indicated segments, the system goes to the next indicated segments, and so on, until presenting the last temporally indicated segment. In this manner the regions between the indicated segments are viewable while maintaining the summary characteristics. This is also useful for regions between indicated summaries that may be of potential interest to the viewer.

The system may also include a no sense mode which, if selected, modifies the functionality of the selectable indicator 56. In the no sense mode, the user may modify the location of the selectable indicator 56 to another position. In the event that the user selects a location within a region between the indicated segments, the system does not relocate the selectable pointer 56 to the closest start of the indicated segments. In the event that the user selects a location within an indicated segment, the system does not relocate the selectable pointer 56 within the indicated segment. In essence, the system does not assists the user in relocating the selectable pointer 56 to the start of one of the indicated segments nor relocates the selectable pointer 56 within the region between indicated segments. After viewing the selected indicated segment, or otherwise the region between the indicated segments, the system continues to present the video in temporal order, including regions between the indicated segments. In this manner the regions between the indicated segments together with the indicated segments, are viewable while maintaining the temporal graphical interface. It is to be understood that other navigational modes may likewise be used, as desired.

Figures 8, 9:
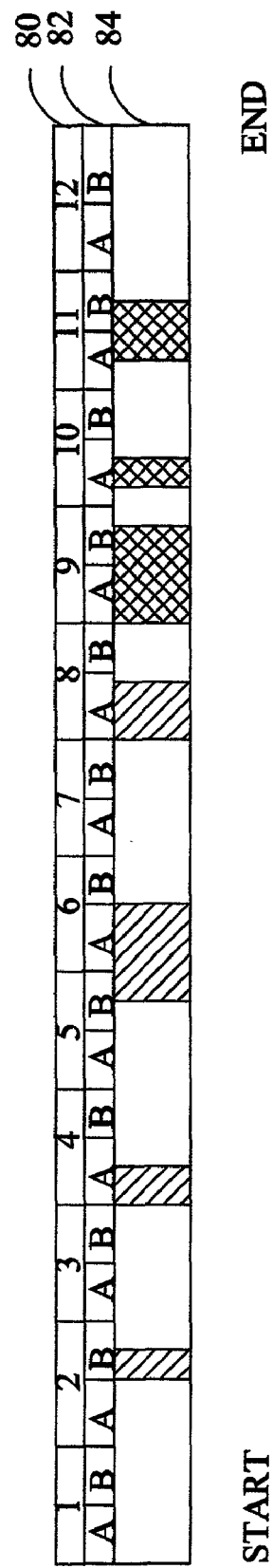
FIG. 8 illustrates hierarchical data relating to a video.
FIG. 9 is an exemplary illustration of yet another alternative time line.

The present inventors came to the realization that descriptions related to video content may include summarization data and preferences, such as the MPEG-7 standard and the TV-Anytime standard. These descriptions may also include navigational information. Moreover, the data within the descriptions may be hierarchical in nature, such as shown in FIG. 8. The most rudimentary presentation of this data is to instantiate a single sequence or branch from the full collection. For instance, presenting a summary of the "slam dunks" for a basketball game. One technique for the presentation of the hierarchical material is to indicate each segment on the time line and thereafter present the sequence, as previously described. After considering the hierarchical nature of the data and the time line presentation of the video material, it was determined that the visual indications on the time line may be structured to present the hierarchical information in a manner that retains a portion of the hierarchical structure. Referring to FIG. 9, one manner of maintaining a portion of the hierarchical structure is to graphically present the information in ever increasing specificity where at least two levels of the hierarchy, preferably different levels, are presented in an overlapping manner. For example, in baseball the time line may include data from the innings 80, the team at bat 82 (e.g., team A, team B), and the plays 84 which may be further differentiated. In the event that the data has hierarchical or non-hierarchical temporal information with overlapping time periods, the temporal information may be displayed in such a manner to maintain the differentiation of the overlapping time periods.

In general, the time line may include multiple layers in a direction perpendicular to the length of the time line. This multiple level representation permits more information regarding the content of the video to be presented to the user in a more compact form and consistent format. The levels may be of different widths and heights, as desired. Also, the techniques for presenting the information in the time line may be associated with a particular layer of the time line. These layers may be managed, in the graphical user interface, as windows that may be minimized, reordered, shrinked or expanded, highlighted differently, etc. Also, the time line layering allows the particular presentation technique for each layer to be dynamically reconfigured by the user.

Figures 10, 11, 12:
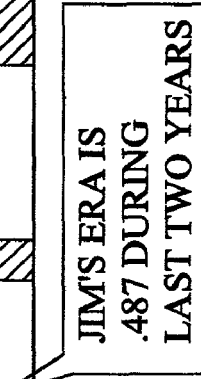
FIG. 10 is an exemplary illustration of yet another alternative time line.
FIG. 11 is an exemplary illustration of yet another alternative time line.
FIG. 12 is an exemplary illustration of yet another alternative time line.

Referring to FIG. 10, to further annotate the time line textual information may be included therein. The textual information may, for example, include the name of the summary segment overlaid on the associated band in the time line. For example, in a football game, the current "down" may be shown. Referring to FIG. 11, textual information may also be presented as floating windows that pop up when the user brings the cursor over the associated segment. For example, in a baseball game, the user may move the cursor over the player-at-bat summary to learn who is batting in each segment, etc. Referring to FIG. 12, audible information may be presented together with the presentation of the video and temporal information. For instance, in a baseball game, the last-pitch-for-player-at-bat and the last-pitch-of-inning, may be associated with distinct audio clips that are played back at the beginning or otherwise associated with these particularly interesting plays.

The techniques discussed herein may likewise be applied to audio content, such as for example, a song, a group of songs, or a classical music symphony. Also, the techniques discussed herein may likewise be applied to audio broadcasts, such as commentary from national public radio or "books on tape". For example, the first paragraph, medical paragraphs, topical information, etc. may be summarized. Moreover, the techniques discussed herein may likewise be applied to audio/visual materials.

The strong sense, mild sense, weak sense, and no sense (see FIG. 7) navigation selections permit enhanced interactivity with the audiovisual material. However, such navigational selections are cumbersome and may not provide the functionality that may be desired by consumers of audiovisual materials. To provide an enhanced experience to consumers of audiovisual summaries additional navigational functionality should be provided, where the functionality is associated with the visual interface presented to the user.

Figure 13:
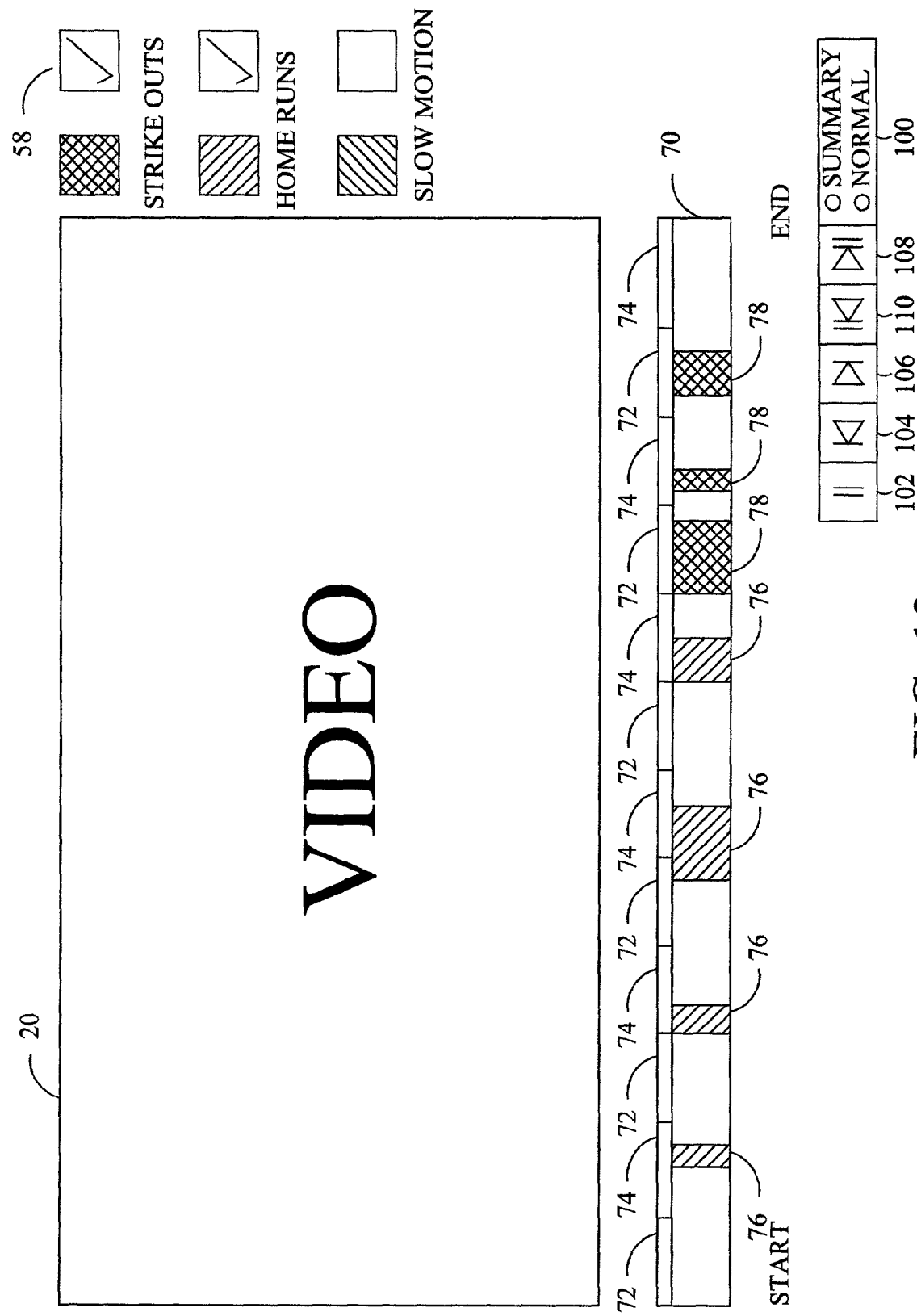
FIG. 13 illustrates additional navigational options.

Referring to FIG. 13, a summary/normal button 100 selection is provided to enable the user to select between the summary presentation (e.g., primarily the summary materials) and the normal presentation (e.g., include both the summary materials and non-summary materials) of the audiovisual materials. A play/pause button 102 begins playback from the current position or pauses the playback at the current position if the program is already playing. A reverse skip button 104 and a forward skip button 106 cause the program to skip rearward or skip forward in the audiovisual content a predetermined time duration or otherwise to another summary portion.

Figure 14:
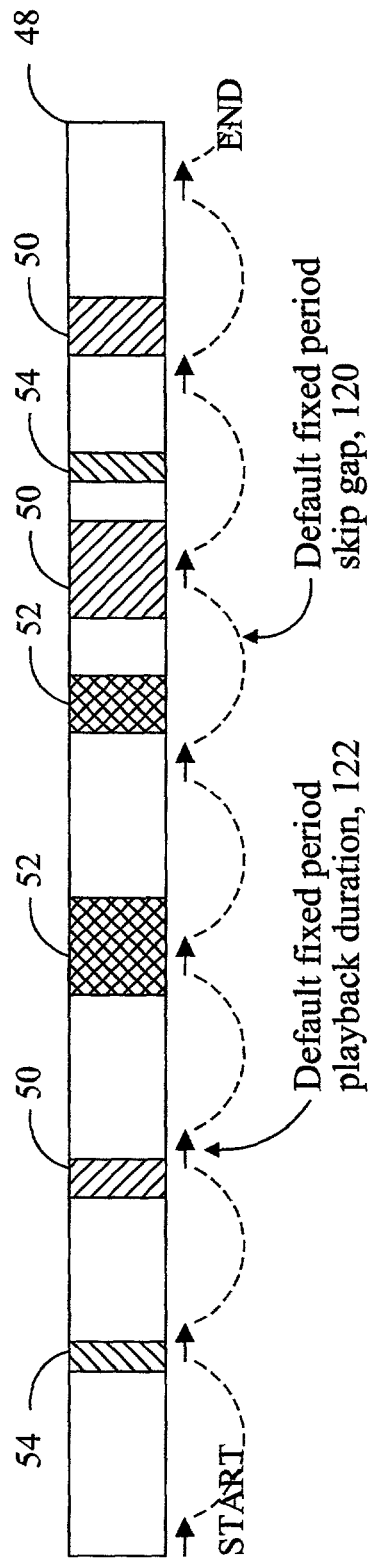
FIG. 14 illustrates a regular scanning time line.

To reduce the time necessary for a user to consume a program the user may use a forward scan button 108 or a reverse scan button 110. Referring to FIG. 14, the forward scan button 108, when coupled with the normal playback 100, may use a predetermined period of time to determine the amount to advance 120 and another predetermined period of time of the short playback portion 122. In essence, each portion is displayed briefly before jumping to the next segment, unless the user decides to terminate the scan and resumes either normal or summary playback. It will be noted that this technique does not make use of the program summary description.

Figure 15:
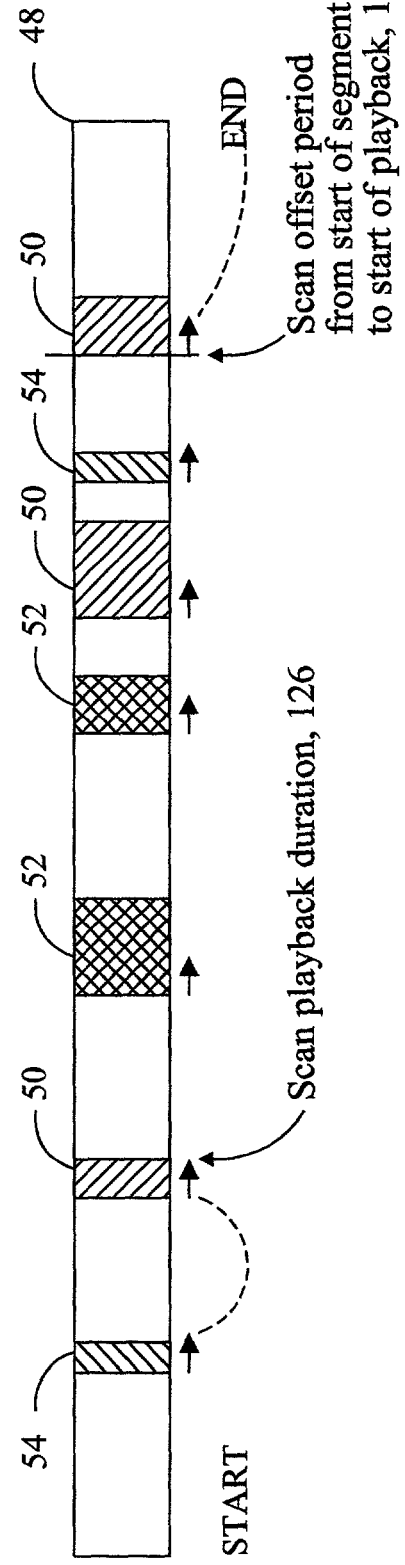
FIG. 15 illustrates a summary scanning time line.

Referring to FIG. 15, the forward scan button 108, when coupled with the summary playback 100, may use the summary description depicted in the scroll bar to determine the amount to advance 124 and another predetermined period of time of the short playback portion 126. In essence, each summary portion is displayed briefly before jumping to the next segment, unless the user decides to terminate the scan and resumes either normal or summary playback. It will be noted that this technique makes use of the program summary description. Different techniques may be used to determine the offset into the program segment as well as the duration of the playback. For example, the offset and duration may be based on the program description or they may be based on a statistical analysis of the segment time boundaries. The example shown in FIG. 15 illustrates an offset of zero seconds (n) and a playback duration at an arbitrary number of seconds. That is, the viewer previews the first n seconds of each of the summary segments.

Another technique to dynamically determine the offset and duration may be by permitting the user to configure the scanning parameters. For instance, the user may press the play or skip button prior to activating the scan operation. Then if the time between pressing the play button (or skip) and pressing the scan button is within a reasonable range, this duration may be used as the scan playback duration parameter. Alternatively, the user may manually select the duration and/or offset parameter. Similarly, the same techniques may be used for the reverse scan button 110.

The user interface may likewise permit the configuration of other scanning operations. For example, the scanning modes may be activated by pressing the skip buttons 104 or 106 for a greater than a "hold" period of time, or the skip buttons 104 or 106 may have a "repeat key" behavior that is equivalent to being in the respective scan modes. The scan modes may be used as a fundamental technique for consuming the program, or as a rapid advance feature which will position the program for further operations. The scan mode may be terminated by any suitable action, such as for example, pressing another button while in the scan mode and/or activating another navigational option (e.g., play, reverse skip, forward skip, etc.).

An navigation example is described, for purposes of illustration, with respect to a baseball viewer that is interested in advancing to and watching all the plays of the game in which their favorite player is playing.

(a) The viewer activates the forward scanning mode by pressing the scan button. The viewer watches the program, waiting to detect their favorite player in the action, at which point they enter normal playback mode by pressing the play button.

(b) The game is then played back at normal rate without skipping or scanning anything. When the player is no longer in the action, the user may return to step (a), or they may, (c) enter summary playback mode by pressing the summary/normal button 100. The game is played back in summary mode, just displaying the program summary segments. When the game becomes dull the player may return to step (a). Or if the favorite player returns to action, the user may (d) re-enter normal (default) playback mode by pressing the summary/normal button. This puts the user back into step (b).

The combined effect of the improved navigational functionality together with the visual information provides a powerful user interface paradigm. Several effects may be realized, such as for example, (a) the visual cues facilitate the navigational process of finding specific program locations, (b) the combination of visual cues and navigation components conveys an impression of the "big picture" in the essence of the whole time line, and (c) the combination forms a feedback loop where the visual cues provide the intuitive feedback for the operation of the navigation controls. As it may be appreciated, the visual cues reinforce the commands and operations activated by the user, giving a strong feedback to the user. For instance, as the user activates the scanning operation, they will observe the scroll bar behavior depicting the scanning action. This in conjunction with the constantly updating main viewing area, gives a clear impression to the user of exactly what the system is doing. This likewise gives the user a stronger sense of control over the viewing experience.

Figure 16:
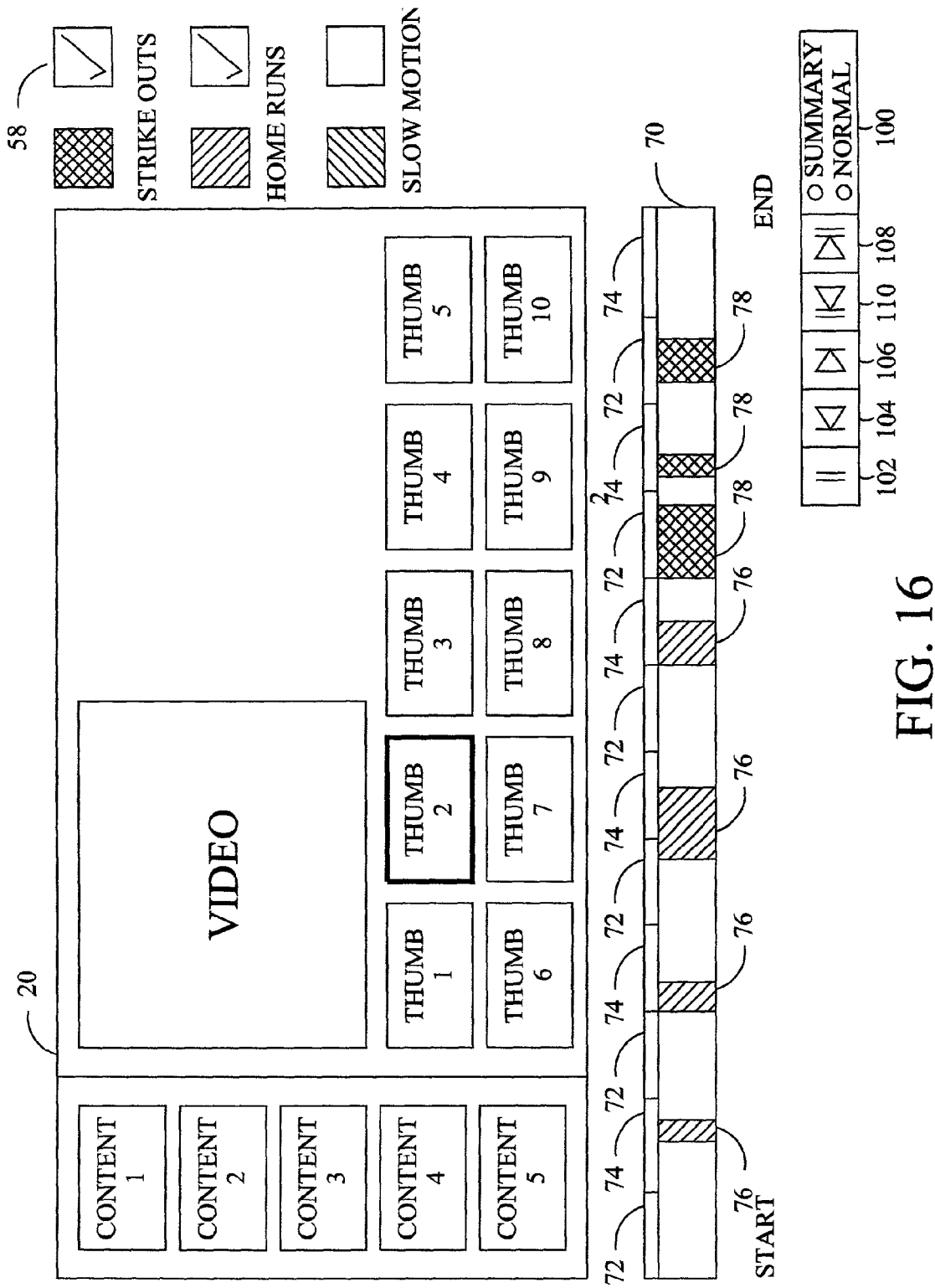
FIG. 16 illustrates summary scanning with a thumbnail index of visual indications.

Referring to FIG. 16, the indexed mode of the program summaries may likewise be associated with thumbnail images that are graphical indices into the program time line, which further enhance the viewing experience. The thumbnail images are associated with respective summary segments, and may be key frames if desired. In addition, the thumbnails presented may be dynamically modified to illustrate a selected set proximate the portion of the program currently being viewed. Also, the thumbnail associated with the summary segment currently being viewed may be highlighted.

As it may be observed, during normal playback the program will highlight thumbnails at a rate based on the different gaps between each segment, which is typically irregular. However, when the program is played back in summary scanning mode, the highlighted thumbnails will advance at a regular pace from segment to segment. This regular (or linear) advancing of the thumbnail indices is a graphical mapping of the irregular (non-linear) advancement of the actual program. That is, the program is playing back in an irregular sequence, while the visual cues are advancing at a regular rate.

The various navigational operations described herein, expanded by their specific configuration parameters, makes possible a large number of complex navigation sequences. Depending on the user, the program genre, and/or the perspective the user has on a particular game (or program), there may be a wide variety of combinations that the user would like to include in a "macro" type navigation function (or button). A customized button (or function) may be provided for the user to perform a desirable sequence of operations. A sample list of navigation operations and their configuration parameters is illustrated below:

| Navigation Operation | Configuration Parameters |
|---|---|
| Regular Skip | Direction |
| | Period of time to advance/retreat |
| | Audio and video fade in periods |
| Smart Skip | Direction |
| | Number of segments to advance/retreat |
| | Segment "theme" patterns (used to filter segments within summary) |
| | Period of time to offset into segment |
| | Base of offset (start or end) |
| | Audio and video fade in periods |
| Regular Scan | Direction |
| | Period of time to advance/retreat |
| | Period of time to playback |
| | Audio and video fade in and fade out periods |
| "Smart" Scan | Direction |
| | Number of segments to advance/retreat |
| | Segment "theme" patterns |
| | Period of time to offset into segment |
| | Base of offset (start or end) |
| | Period of time to playback |
| | Audio and video fade in and fade out periods |
| Play | Duration |
| | Smart or default playback mode |
| Pause | Duration |

One example of a personalized nagivational control is a button configured to "replay the last two seconds of the segment previously viewed." This macro button could be as follows: smart skip, in reverse, one segment, no theme change, offset two seconds, from end of segment, with zero fade in; play, for two seconds, in default mode; and resume prior navigation operation.

The invention claimed is:

1. A method of presenting information regarding a video comprising a plurality of frames comprising:
   (a) summarizing a video, said summarization comprising a plurality of segments of said video, based upon an event characterized by a semantic event that includes a sports play, where each of said segments includes a plurality of sequential frames of said video;
   (b) displaying said summarization in a first portion of a display; and
   (c) displaying a graphical user interface on a second portion of said display, simultaneously with said summarization, said interface sequentially indicating the relative location of each of said plurality of segments within said summarization relative to at least one other of said segments as each of said plurality of segments is displayed, each of said plurality of segments represented by a bounded spatial region on said second portion of said display, said bounded spatial region having a respective size based on the number of sequential frames included in the respective segment represented by said bounded spatial region;
   (d) displaying to a user said relative location for a first semantic characterization of a said sports play in said video using a first visual indication and displaying said relative location for a second semantic characterization of a said sports play in said video using a second visual indication different from said first visual indication, where said first and second semantic characterizations are each individually distinguishable when their associated visual indications graphically overlap;
   (e) receiving from said user, by interaction with said graphical user interface, a selection of one of said plurality of segments;
   (f) in response to said selection, presenting a selected one of said plurality of segments and not presenting at least one other of said plurality of segments; and
   (g) wherein a user selects a portion of said video not included within said plurality of segments, in response thereto, said system presents said selected portion not included within said plurality of segments, and wherein after presenting said selected portion not included within said plurality of segments presents said selected plurality of segments in temporal order without portions of said video not included within said plurality of segments, and wherein said user selects a portion of said video included within said plurality of segments, in response thereto, said system presents said portion of said video within said plurality of segments.

2. The method of claim 1 wherein said first and second semantic characterizations of a said sports play temporally overlap in said summarization.

3. The method of claim 1 wherein said graphical user interface includes a generally rectangular region where each of said plurality of segments is indicated within said generally rectangular region.

4. The method of claim 1 wherein the size of each of said plurality of segments is indicated in a manner such that said plurality of segments with a greater number of frames are larger than said plurality of segments with a lesser number of frames.

5. The method of claim 4 wherein the size of the regions between each of said plurality of segments is indicated in a manner such that said regions between with a greater number of frames are larger than said plurality of segments with a lesser number of frames.

6. The method of claim 4 where said user selects one of said plurality of segments by interacting with said graphical user interface at a point within the displayed bounded spatial region associated with the selected one of said plurality of segments.

7. The method of claim 6 wherein presentation of a selected one of said plurality of segments begins at the first frame of said segment irrespective of which point within said displayed bounded spatial region that said user interacted with.

8. The method of claim 7 including a user-moveable scroll bar on said graphical user interface indicating the relative temporal location of currently-presented frames of said summary, wherein said user selects one of said plurality of segments by moving said scroll bar over the selected one of said plurality of segments, and where said scroll bar snaps to the beginning of the selected one of said plurality of segments.

9. The method of claim 6 wherein presentation of a selected one of said plurality of segments begins at a frame of said segment temporally corresponding to the point within said displayed bounded spatial region that said user interacted with.

10. The method of claim 6 including a selector by which said user may alternatively select a chosen one of (i) presentation of a selected one of said plurality of segments beginning at the first frame of said segment irrespective of which point within said displayed bounded spatial region that said user interacted with; and (ii) presentation of a selected one of said plurality of segments beginning at a frame of said segment temporally corresponding to the point within said displayed bounded spatial region that said user interacted with.

11. The method of claim 1 wherein at least two of said plurality of segments are temporally overlapping.

12. The method of claim 11 wherein said temporally overlapping segments are visually indicated in a manner such that each of said overlapping segments are independently identifiable.

13. The method of claim 1 wherein a user selects a portion of said video not included within said plurality of segments, wherein in response thereto, said system presents one of said plurality of segments.

14. The method of claim 13 wherein said one of said plurality of segments is the segment most temporally adjacent to said portion of said video.

15. The method of claim 13 wherein said one of said plurality of segments is the next temporally related segment.

16. The method of claim 13 wherein said one of said plurality of segments is the previous temporally related segment.

17. The method of claim 1 wherein a user selects a portion of said video included within said plurality of segments, wherein in response thereto, said system presents said portion of said video from the start thereof.

18. The method of claim 1 wherein a user selects a portion of said video not included within said plurality of segments, wherein in response thereto, said system presents one of said plurality of segments, and wherein said user selects a portion of said video included within said plurality of segments, wherein in response thereto, said system presents said portion of said video within said plurality of segments.

19. The method of claim 1 wherein a user selects a portion of said video not included within said plurality of segments, wherein in response thereto, said system presents one of said plurality of segments, and wherein said user selects a portion of said video included within said plurality of segments, wherein in response thereto, said system presents said portion of said video within said plurality of segments starting from the beginning thereof.

20. The method of claim 1 wherein said temporal information is hierarchical and is displayed in such a manner to retain a portion of its hierarchical structure.

21. The method of claim 1 wherein said temporal information relates to overlapping time periods and said temporal information is displayed in such a manner to maintain the differentiation of said overlapping time periods.

22. The method of claim 1 wherein said temporal information is displayed within a time line, wherein the temporal information is presented in a plurality of layers in a direction perpendicular to the length of said time line.

23. The method of claim 1 wherein said temporal information is displayed within a time line, wherein textual information is included within said time line.

24. The method of claim 1 wherein said temporal information is displayed within a time line, wherein additional textual information is displayed upon selecting a portion of said time line.

25. The method of claim 1 wherein said temporal information is displayed together with a time line, wherein additional textual information is displayed together with selecting a portion of said time line.

26. The method of claim 1 wherein said temporal information is displayed within a time line, wherein additional audio annotation is presented upon presenting a portion of said time line.

27. A method of presenting information regarding a video comprising a plurality of frames comprising:
   (a) identifying a plurality of different segments of said video, where each of said segments includes a plurality of frames of said video;
   (b) displaying, simultaneously with a said segment of said video, a graphical user interface including information regarding the temporal location of a said segment relative to at least one other of said segments of said video;
   (c) displaying in an interactive display said temporal location for a first semantic characterization of an event in said video using a first visual indication and displaying said temporal location for a second semantic characterization of an event in said video using a second visual indication different from said first visual indication, where said first and second semantic characterizations are each individually distinguishable when their associated visual indications graphically overlap;
   (d) displaying to a user at least one selector by which said user may interact with said interactive display to select for viewing selective identified ones of said plurality of segments;
   (e) receiving user-selections of identified ones of said plurality of different segments;
   (f) presenting user-selected ones of said plurality of different segments; and
   (g) wherein a user selects a portion of said video not included within said plurality of different segments, in response thereto, said system presents said selected portion not included within said plurality of different segments, and wherein after presenting said selected portion not included within said plurality of different segments presents said selected plurality of different segments in temporal order without portions of said video not included within said plurality of different segments, and wherein said user selects a portion of said video included within said plurality of different segments, in response thereto, said system presents said portion of said video within said plurality different of segments.

28. The method of claim 27 wherein said graphical user interface includes a generally rectangular region where each of said plurality of segments is indicated within said generally rectangular region.

29. The method of claim 27 wherein the size of each of said plurality of segments is indicated in a manner such that said plurality of segments with a greater number of frames are larger than said plurality of segments with a lesser number of frames.

30. The method of claim 29 wherein the size of the regions between each of said plurality of segments is indicated in a manner such that said regions between with a greater number of frames are larger than said plurality of segments with a lesser number of frames.

31. The method of claim 27 further comprising an indicator that indicates the current position within said temporal information of a currently displayed portion of said video.

32. The method of claim 31 wherein said indicator changes location relative to said temporal information as the portion of said currently displayed portion of said video changes.

33. The method of claim 27 further comprising
   (a) indicating with an indicator the current position within said temporal information of a currently displayed portion of said video; and
   (b) modifying the position of said indicator within said temporal information which modifies the displayed portion of said video.

34. The method of claim 33 wherein said indicator is modified to a portion of said video that is not included within said plurality of segments.

35. The method of claim 27 wherein at least two of said plurality of segments are temporally overlapping.

36. The method of claim 35 wherein said temporally overlapping segments are visually indicated in a manner such that each of said overlapping segments are independently identifiable.

37. The method of claim 27 wherein a user selects a portion of said video not included within said plurality of segments, wherein in response thereto, said system presents one of said plurality of segments.

38. The method of claim 37 wherein said one of said plurality of segments is the segment most temporally adjacent to said portion of said video.

39. The method of claim 37 wherein said one of said plurality of segments is the next temporally related segment.

40. The method of claim 37 wherein said one of said plurality of segments is the previous temporally related segment.

41. The method of claim 27 wherein a user selects a portion of said video included within said plurality of segments, wherein in response thereto, said system presents said portion of said video from the start thereof.

42. The method of claim 27 wherein a user selects a portion of said video not included within said plurality of segments, wherein in response thereto, said system presents one of said plurality of segments, and wherein said user selects a portion of said video included within said plurality of segments, wherein in response thereto, said system presents said portion of said video within said plurality of segments.

43. The method of claim 27 wherein a user selects a portion of said video not included within said plurality of segments, wherein in response thereto, said system presents one of said plurality of segments, and wherein said user selects a portion of said video included within said plurality of segments, wherein in response thereto, said system presents said portion of said video within said plurality of segments starting from the beginning thereof.

44. The method of claim 27 wherein said temporal information is hierarchical and is displayed in such a manner to retain a portion of its hierarchical structure.

45. The method of claim 27 wherein said temporal information relates to overlapping time periods and said temporal information is displayed in such a manner to maintain the differentiation of said overlapping time periods.

46. The method of claim 27 wherein said temporal information is displayed within a time line, wherein the temporal information is presented in a plurality of layers in a direction perpendicular to the length of said time line.

47. The method of claim 27 wherein said temporal information is displayed within a time line, wherein textual information is included within said time line.

48. The method of claim 27 wherein said temporal information is displayed within a time line, wherein additional textual information is displayed upon selecting a portion of said time line.

49. The method of claim 27 wherein said temporal information is displayed together with a time line, wherein additional textual information is displayed together with selecting a portion of said time line.

50. The method of claim 27 wherein said temporal information is displayed within a time line, wherein additional audio annotation is presented upon presenting a portion of said time line.

51. The method of claim 27 wherein a user selectable skip function skips a set of frames to a modified location of said video in at least one of a forward temporal direction or a reverse temporal direction, and displays said video at said modified location.

52. The method of claim 27 wherein a user selectable skip function skips to a later temporal segment or a previous temporal segment, and displays said video at said later temporal segment or said previous temporal segment, respectively.

53. The method of claim 27 wherein a user selectable scan function skips a set of frames to a modified location of said video in at least one of a forward temporal direction or a reverse temporal direction, and displays said video at said modified location, and thereafter automatically skips another set of frames to another modified location of said video in at least one of said forward temporal direction or said reverse temporal direction, and displays said video at said another modified location.

54. The method of claim 53 wherein at least one of said forward temporal direction and said reverse temporal direction are consistent with said different segments.

55. The method of claim 54 wherein said display of said video is at the start of the respective one of said different segments.

56. The method of claim 54 wherein said display of said video is at a predetermined offset within the respective one of said different segments.

57. The method of claim 56 wherein said respective image associated with the currently presented said different segments is visually highlighted.

58. The method of claim 27 wherein said graphical user interface displays a respective image associated with at least a plurality of said different segments.

59. The method of claim 58 wherein during presentation of said video said visually highlighted respective images are said highlighted in a substantially regular interval while the sequence of said presentation of said video is at substantially irregular intervals.

60. A method of presenting information regarding audio comprising:

(a) identifying a plurality of different segments of said audio, where each of said segments includes a temporal duration of said audio;

(b) displaying simultaneously with said segment of said audio a graphical user interface including information regarding the temporal location of a said segment relative to at least one other of said segment of said audio;

(c) displaying in an interactive display said temporal location for a first semantic characterization of an event in said audio using a first visual indication and displaying said temporal location for a second semantic characterization of an event in said audio using a second visual indication different from said first visual indication, where said first and second semantic characterizations are each individually distinguishable when their associated visual indications graphically overlap;

(d) displaying to a user at least one selector by which said user may interact with said display to select for listening selective identified ones of said plurality of segments;

(e) receiving user-selections of identified ones of said plurality of different segments; and (f) presenting user-selected ones of said plurality of different segments; and (g) wherein a user selects a portion of said audio not included within said plurality of different segments, in response thereto, said system presents said selected portion not included within said plurality of different segments, and wherein after presenting said selected portion not included within said plurality of different segments presents said selected plurality of different segments in temporal order without portions of said audio not included within said plurality of different segments, and wherein said user selects a portion of said audio included within said plurality of different segments, in response thereto, said system presents said portion of said audio within said plurality different of segments.

61. The method of claim 60 further comprising (a) indicating with an indicator the current position within said temporal information of a currently displayed portion of said audio; and (b) modifying the position of said indicator within said temporal information which modifies the displayed portion of said audio.

62. The method of claim 61 wherein said indicator is modified to a portion of said audio that is not included within said plurality of segments.

63. The method of claim 60 wherein at least two of said plurality of segments are temporally overlapping.

64. The method of claim 63 wherein said temporally overlapping segments are visually indicated in a manner such that each of said overlapping segments are independently identifiable.

65. The method of claim 60 wherein a user selects a portion of said audio not included within said plurality of segments, wherein in response thereto, said system presents one of said plurality of segments.

66. The method of claim 65 wherein said one of said plurality of segments is the segment most temporally adjacent to said portion of said audio.

67. The method of claim 65 wherein said one of said plurality of segments is the next temporally related segment.

68. The method of claim 62 wherein said one of said plurality of segments is the previous temporally related segment.

69. The method of claim 60 wherein a user selects a portion of said audio included within said plurality of segments, wherein in response thereto, said system presents said portion of said audio from the start thereof.

70. The method of claim 60 wherein a user selects a portion of said audio not included within said plurality of segments, wherein in response thereto, said system presents one of said plurality of segments, and wherein said user selects a portion of said audio included within said plurality of segments, wherein in response thereto, said system presents said portion of said audio within said plurality of segments.

71. The method of claim 60 wherein a user selects a portion of said audio not included within said plurality of segments, wherein in response thereto, said system presents one of said plurality of segments, and wherein said user selects a portion of said audio included within said plurality of segments, wherein in response thereto, said system presents said portion of said audio within said plurality of segments starting from the beginning thereof.

72. The method of claim 60 wherein said temporal information is hierarchical and is displayed in such a manner to retain a portion of its hierarchical structure.

73. The method of claim 60 wherein said temporal information relates to overlapping time periods and said temporal information is displayed in such a manner to maintain the differentiation of said overlapping time periods.

74. The method of claim 60 wherein said temporal information is displayed within a time line, wherein the temporal information is presented in a plurality of layers in a direction perpendicular to the length of said time line.

75. The method of claim 60 wherein said temporal information is displayed within a time line, wherein textual information is included within said time line.

76. The method of claim 60 wherein said temporal information is displayed within a time line, wherein additional textual information is displayed upon selecting a portion of said time line.

77. The method of claim 60 wherein said temporal information is displayed together with a time line, wherein additional textual information is displayed together with selecting a portion of said time line.

78. The method of claim 60 wherein said temporal information is displayed within a time line, wherein additional audio annotation is presented upon presenting a portion of said time line.

79. The method of claim 60 wherein the presentation of said different segments may be modified by a plurality of different functions, and wherein the user may customize another function, not previously explicitly provided, by combining a plurality of said plurality of different functions into a single function.

80. A method of presenting information regarding a video comprising a plurality of frames comprising:
 (a) identifying a plurality of different segments of said video, where each of said segments includes a plurality of frames of said video;
 (b) displaying, simultaneously with a said segment of said video, a graphical user interface including information regarding the temporal location of a said segment relative to at least one other of said segments of said video;
 (c) displaying in an interactive display said temporal location for a first semantic characterization of an event in said video using a first visual indication and displaying said temporal location for a second semantic characterization of an event in said video using a second visual indication different from said first visual indication;
 (d) displaying to a user at least one selector by which said user may interact with said interactive display to select for viewing selective identified ones of said plurality of segments;
 (e) receiving user-selections of identified ones of said plurality of segments;
 (f) presenting user-selected ones of said plurality of different segments; wherein
 (g) wherein a user selects a portion of said video not included within said plurality of segments, and wherein in response thereto, said system presents said selected portion not included within said plurality of segments, and wherein after presenting said selected portion not included within said plurality of segments presents said selected plurality of segments in temporal order without portions of said video not included within said plurality of segments, and wherein said user selects a portion of said video included within said plurality of segments, wherein in response thereto, said system presents said portion of said video within said plurality of segments.

* * * * *